US012226920B2

(12) United States Patent
Khansari Zadeh et al.

(10) Patent No.: US 12,226,920 B2
(45) Date of Patent: Feb. 18, 2025

(54) SYSTEM(S) AND METHOD(S) OF USING IMITATION LEARNING IN TRAINING AND REFINING ROBOTIC CONTROL POLICIES

(71) Applicant: GOOGLE LLC, Mountain View, CA (US)

(72) Inventors: Seyed Mohammad Khansari Zadeh, San Carlos, CA (US); Eric Jang, Cupertino, CA (US); Daniel Lam, Mountain View, CA (US); Daniel Kappler, San Francisco, CA (US); Matthew Bennice, San Jose, CA (US); Brent Austin, Munich (DE); Yunfei Bai, Fremont, CA (US); Sergey Levine, Berkeley, CA (US); Alexander Irpan, Palo Alto, CA (US); Nicolas Sievers, El Cerrito, CA (US); Chelsea Finn, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/233,251

(22) Filed: Aug. 11, 2023

(65) Prior Publication Data
US 2023/0381970 A1     Nov. 30, 2023

Related U.S. Application Data

(63) Continuation of application No. 17/203,296, filed on Mar. 16, 2021, now Pat. No. 11,772,272.

(51) Int. Cl.
    *B25J 9/16*            (2006.01)
    *B25J 13/06*          (2006.01)

(52) U.S. Cl.
    CPC .............. *B25J 9/1697* (2013.01); *B25J 9/161* (2013.01); *B25J 9/163* (2013.01); *B25J 9/1661* (2013.01); *B25J 13/06* (2013.01)

(58) Field of Classification Search
    CPC . B25J 9/1697; B25J 9/161; B25J 9/163; B25J 9/1661; B25J 13/06; B25J 9/1656;
(Continued)

(56) References Cited

U.S. PATENT DOCUMENTS 11,772,272 B2 * 10/2023 Khansari Zadeh ...... B25J 9/163
                                                   700/259
2018/0319015 A1 * 11/2018 Sinyavskiy .......... G05D 1/0246
(Continued)

FOREIGN PATENT DOCUMENTS

| CN | 103203753 | 7/2013 |
|---|---|---|
| CN | 104802174 | 7/2015 |

(Continued)

OTHER PUBLICATIONS

European Patent Office; International Search Report and Written Opinion issued in Application No. PCT/US2022/015252; 24 pages; dated Aug. 8, 2022.
(Continued)

*Primary Examiner* — Masud Ahmed
*Assistant Examiner* — Dylan M Katz
(74) *Attorney, Agent, or Firm* — Gray Ice Higdon

(57) ABSTRACT

Implementations described herein relate to training and refining robotic control policies using imitation learning techniques. A robotic control policy can be initially trained based on human demonstrations of various robotic tasks. Further, the robotic control policy can be refined based on human interventions while a robot is performing a robotic task. In some implementations, the robotic control policy may determine whether the robot will fail in performance of the robotic task, and prompt a human to intervene in performance of the robotic task. In additional or alternative implementations, a representation of the sequence of actions
(Continued)

can be visually rendered for presentation to the human can proactively intervene in performance of the robotic task.

19 Claims, 11 Drawing Sheets

(58) Field of Classification Search
CPC .......... G05B 2219/33002; G05B 2219/39244; G05B 2219/39376; G05B 2219/40153; G05B 2219/39438; G05B 2219/39451; G05B 2219/40102; G05B 2219/40391
See application file for complete search history.

(56) References Cited

U.S. PATENT DOCUMENTS

| | | | |
|---|---|---|---|
| 2019/0152054 A1* | 5/2019 | Ishikawa | B25J 9/163 |
| 2019/0337150 A1 | 11/2019 | Parikh | |
| 2020/0086483 A1 | 3/2020 | Li | |
| 2020/0114506 A1 | 4/2020 | Toshev | |
| 2021/0023711 A1* | 1/2021 | Lee | B25J 9/1697 |
| 2021/0125068 A1* | 4/2021 | Kim | G06F 18/10 |
| 2021/0362328 A1* | 11/2021 | Kolluri | B25J 13/06 |
| 2022/0270198 A1* | 8/2022 | Han | H04N 23/90 |
| 2022/0288787 A1 | 9/2022 | Dupree | |
| 2022/0289537 A1 | 9/2022 | Davidson | |
| 2022/0297303 A1 | 9/2022 | Khansari Zadeh et al. | |

FOREIGN PATENT DOCUMENTS

| | | |
|---|---|---|
| CN | 110769985 | 2/2020 |
| CN | 111300431 | 6/2020 |
| CN | 112313044 | 2/2021 |
| WO | 2020142498 | 7/2020 |
| WO | 2020154542 | 7/2020 |
| WO | 2021034303 | 2/2021 |

OTHER PUBLICATIONS

European Patent Office; Invitation to Pay Additional Fees issued in Application No. PCT/US2022/015252; 16 pages; dated May 22, 2022.
Kappler et al.; Data-Driven Online Decision Making for Autonomous Manipulation; Robotics: Science and Systems XI; 9 pages; dated Jul. 13, 2015.
Ijspeert et al.; Dynamical Movement Primitives: Learning Attractor Models for Motor Behaviors; Neural computation; 46 pages; dated Feb. 1, 2013.
Pastor et al.; Online Movement Adaptation Based on Previous Sensor Experiences; Intelligent Robots and Systems; 2011 IEEE/RSJ International Conference on IEEE; 7 pages; dated Sep. 25, 2011.
Mandlekar et al., "Human-in-the-Loop Imitation Learning using Remote Teleoperation" arXiv.2012.06733v1 [cs.RO]. 8 pages. Dec. 12, 2020.
Argall, B. et al. "A Survey of Robot Learning from Demonstration"; Robotics and Autonomous Systems, Elsevier BV, vol. 57, No. 5, pp. 469-483; May 31, 2009.
Schaal, S. (1999). "Is Imitation Learning the Route to Humanoid Robots?" Trends in Cognitive Sciences, 3(6), 233-242.
Rahmatizadeh, R. et al.; "Vision-Based Multi-Task Manipulation for Inexpensive Robots Using End-to-End Learning from Demonstration;" Version 1; retrieved from internet: https://arXiv.org/pdf/1707.02920v1.pdf; 11 pages; dated Jul. 10, 2017.
Julian, R., et al., "Never Stop Learning: The Effectiveness of Fine-Tuning in Robotic Reinforcement Learning," arXiv.org, arXiv:2004.10190v2; 13 pages; Jul. 31, 2020.
Ross, S. et al., "A Reduction of Imitation Learning and Structured Prediction to No-Regret Online Learning;" in Proceedings of the 14th International Conference on Artificial Intelligence and Statistics (AISTATS); pp. 627-635; dated 2011.
Laskey, M. et al., "DART: Noise Injection for Robust Imitation Learning;" arXiv.org, arXiv:1703.09327v2; 14 pages; Oct. 18, 2017.
Kelly, M. et al., "HG-DAgger: Interactive Imitation Learning with Human Experts;" in 2019 International Conference on Robotics and Automation (ICRA). IEEE, pp. 8077-8083; May 2019.
Schaal, S. et al., "Computational Approaches to Motor Learning by Imitation;" Philosophical Transactions of the Royal Society of London B: Biological Sciences; pp. 537-547; 2003.
Ratliff, N. et al., "Imitation Learning for Locomotion and Manipulation;" in International Conference on Humanoid Robots; 12 pages; 2007.
Pastor, P. et al., "Learning and Generalization of Motor Skills by Learning from Demonstration," in International Conference on Robotics and Automation (ICRA); 6 pages; 2009.
Pomerleau, D., "ALVINN: An Autonomous Land Vehicle in a Neural Network;" in Neural Information Processing Systems (NIPS); 9 pages; 1989.
Bojarski, M. et al., "End to End Learning for Self-Driving Cars;" arXiv.org, arXiv:1604.07316v1; 9 pages; Apr. 25, 2016.
Zhang, T. et al., "Deep Imitation Learning for Complex Manipulation Tasks from Virtual Reality Teleoperation;" arXiv.org, arXiv:1710.04615v1; Oct. 12, 2017.
Abbeel, P. et al., "Apprenticeship Learning Via Inverse Reinforcement Learning," in International Conference on Machine Learning (ICML), ACM; 8 pages; 2004.
Ziebart, B. et al., "Maximum Entropy Inverse Reinforcement Learning;" in Proceedings of the 23rd AAAI Conference on Artificial Intelligence; 6 pages; 2008.
Finn, C. et al., "Guided Cost Learning: Deep Inverse Optimal Control Via Policy Optimization;" in International Conference on Machine Learning (ICML); 10 pages; 2016.
Ho, J. et al., "Generative Adversarial Imitation Learning," in Neural Information Processing Systems (NIPS); 9 pages; 2016.
Laskey, M. et al., "SHIV: Reducing Supervisor Burden in Dagger Using Support Vectors for Efficient Learning From Demonstrations in High Dimensional State Spaces;" in International Conference on Robotics and Automation (ICRA); 8 pages; 2016.
Zhang, J. et al., "Query-Efficient Imitation Learning for End-to-End Simulated Driving;" in AAAI Conference on Artificial Intelligence; 7 pages; 2017.
Spencer, J. et al., "Learning from Interventions: Human-Robot Interaction as Both Explicit and Implicit Feedback;" Robotics: Science and Systems 2020; 10 pages; Jul. 2020.
Brown, D. S. et al., "Better-than-Demonstrator Imitation Learning via Automatically-Ranked Demonstrations;" in Conference on Robot Learning; 30 pages; 2020.
Thrun, S., "Lifelong Learning Algorithms," in Learning to Learn, Springer, pp. 181-209, 1998.
Chinese Patent Office; Notice of Allowance issued in Application No. 202280033988.4; 9 pages; dated Apr. 15, 2024.

* cited by examiner

SYSTEM(S) AND METHOD(S) OF USING IMITATION LEARNING IN TRAINING AND REFINING ROBOTIC CONTROL POLICIES

BACKGROUND

Various techniques have been proposed to enable robots to perform various real-world tasks. For example, some techniques employ imitation learning to train robotic control policies that are utilized in controlling robots to perform these tasks. In imitation learning, these robotic control policies can be initially trained based on data from a plurality of human demonstrations of these tasks. For instance, a human may physically manipulate a given robot, or an end effector thereof, to cause a reference point of the given robot or the end effector to traverse the particular trajectory—and that particular traversed trajectory may thereafter be repeatable by using a robotic control policy trained based on the physical manipulation by the human. Also, for instance, the human may control a given robot, or end effector thereof, using one or more teleoperation techniques to perform a given task, and the given task may thereafter be repeatable by using a robotic control policy trained based on one or more of the teleoperation techniques.

Despite a given robot utilizing robotic control policies that are trained based on the plurality of human demonstrations of these tasks, the given robot may still fail in performing these tasks. For example, the robotic control policies may not be robust enough to enable failure-free performance of the robotic tasks in various situations. As a result, the trained robotic control policies may need to be refined based on human feedback. One technique for refining trained robotic control policies is dataset aggregation (DAgger). In DAgger, a given robot may perform a given task using a given robotic control policy, and a human may be randomly prompted to intervene to evaluate performance of the task. This allows the human to provide feedback with respect to the given robot's performance of the given task. However, this may result in the human being prompted to intervene when the given robot is performing the task correctly, and the human not being prompted to intervene when the given robot is not performing the task correctly (i.e., failing). Moreover, the human feedback in DAgger is generally unified into a defined reward function that is utilized to refine the given robotic control policy, which prevents non-expert humans from being able to refine the given robotic control policy.

SUMMARY

Implementations described herein are directed to training robotic control policies using imitation learning techniques. As used herein, a robotic control policy refers to machine learning (ML) model(s) and a system that utilizes output, generated using the ML model(s), in controlling a robot. A given robotic control policy can be trained to generate, at each iteration, a sequence of actions based on processing an instance of vision data that captures an environment of a given robot during performance of a robotic task. In some implementations, the given robotic control policy can additionally or alternatively process state data (e.g., environmental state data and/or robot state data), force value(s), and/or other sensor data in generating the sequence of actions. The sequence of actions can include a next action to be performed by the given robot in furtherance of the robotic task and a sequence of predicted actions that are predicted to follow the next action. Accordingly, at each iteration, the next action can be generated, and the next action can be implemented by the given robot. Further, at each iteration, a sequence of predicted actions that are predicted to follow the next action, can also be generated. It is noted that one or more of the predicted actions included in the sequence of predicted actions will only actually be performed if they are a next action predicted in a corresponding subsequent iteration. However, as described herein, predicting the sequence of predicted actions that are predicted to follow the next action can achieve various benefits. Such benefits include, for example, more efficient training of the given robotic control policy, the given robotic control policy being more accurate and/or robust, and/or utilization of predicted action (s) included in the sequence of actions in visually rendering corresponding representation(s) for presentation to a user in refining the given robotic control policy (e.g., to enable the user to determine whether to intervene).

In some implementations, the given robotic control policy can be further trained to determine whether the given robot will fail in performance of the robotic task, and can, in response to determining the given robot will fail in performance of the robotic task, cause a prompt, that requests a human (or user) to intervene in performance of the robotic task, to be rendered for presentation to the user. As described herein, in some of those implementations, the robotic control policy can have a plurality of disparate control heads. Some of the control heads are utilized to generate corresponding sets of values for controlling respective components of the robot (or portions thereof) based on processing an instance of vision data using the robotic control policy. One of the control heads (also referred to as a failure head) can process the same instance of the vision data to predict whether the robot has failed, or will fail, in performance of the robotic task, and the prompt can be generated and presented to the user based on output generated using this failure head. In additional or alternative implementations, the user can proactively intervene with performance of the robotic task based on the representation of the next action and the sequence of predicted actions that is visually rendered for presentation to the user. Accordingly, training and refining the given robotic control policy in these and other manners can achieve various benefits. Such benefits include, for example, mitigating occurrences of requesting human intervention when the human intervention is not needed to correct performance of various robotic tasks, and also mitigating occurrences of not requesting human intervention when the human intervention is needed to correct performance of various robotic tasks.

Implementations described herein are additionally or alternatively directed to utilization of one or more architectures for the ML model(s) of a robotic control policy. For example, an ML model architecture can include one or more input layers, a plurality of intermediate layers, and a plurality of disparate control heads. An instance of vision data that captures an environment of a given robot during performance of a robotic task can be provided as input to one or more of the input layers, and an intermediate representation of the instance of the vision data (e.g., an encoding, an embedding, etc.) can be generated across the plurality of intermediate layers. The intermediate representation of the instance of the vision data can be provided as input to each of a plurality of disparate control heads to generate, for each action included in the sequence of actions, corresponding sets of values utilized in controlling a respective component of the robots. The corresponding sets of values utilized in controlling a respective component of the robots can be, for example, a vector that describes a translational displacement (e.g., a sine-cosine encoding of the change in orientation about an axis of the respective component) of the respective component, lower-level control command(s) (e.g., individual torque commands that control corresponding actuator (s) of the robot, individual joint angles of component(s) of the robot, etc.), binary values for component(s) of the robot (e.g., indicative of whether a robot gripper should be opened or closed), other values for component(s) of the robot (e.g., indicative of an extent to which a robot gripper should be opened or closed), velocities and/or accelerations of component(s) of the robot (e.g., robot arm movement, robot base movement, etc.), and/or other values that can be utilized to control the robot.

For example, a first control head can be used to generate a corresponding set(s) of values that reflect a translational displacement (e.g., two-dimensional or three-dimensional) of a robot end effector and the corresponding set(s) of values may be associated with controlling the robot end effector for one or more of the actions included in the sequence of actions; a second control head can be used to generate a corresponding set(s) of values that reflect an orientation of the robot end effector and the corresponding set(s) of values may be associated with controlling the robot end effector for one or more of the actions included in the sequence of actions; a third control head can be used to generate a corresponding set(s) of values that reflect an actuation state of the robot end effector (or an extent of the actuation state of the robot end effector) and the corresponding set(s) of values may be associated with controlling the robot end effector for one or more of the actions included in the sequence of actions; a fourth control head can be used to generate a corresponding set(s) of values that reflect a robot base velocity and the corresponding set(s) of values may be associated with controlling the robot base for one or more of the actions included in the sequence of actions; a fifth control head can be used to generate a corresponding set(s) of values that reflect an orientation of a robot head (e.g., pan and/or tilt) and the corresponding set(s) of values may be associated with controlling the orientation of the robot head for one or more of the actions included in the sequence of actions; and/or other control heads for controlling other components of the robot. Although particular control heads associated with particular components of a robot are described above, it should be understood that is for the sake of example and is not meant to be limiting, and that the control heads utilized by the robotic control policy may be a function of the components of the robot performing the robotic task. For instance, if the robot does not include a robot base (e.g., a stationary robot arm), then the control head associated with the robot base may not be utilized. Also, for instance, if the robot includes robot legs, rather than a robot base, a control head associated with one or more robot legs can be utilized in lieu of a control head for the robot base. Moreover, although particular control heads are described above with respect to controlling disparate components of the robot, it should be understood that is for the sake of example and is not meant to be limiting. For instance, a first control head can be associated with controlling a first portion of a first component of the robot (e.g., the orientation of the robot end effector), and a disparate second control head can be associated with controlling a second portion of the first component of the robot (e.g., the actuation state of the robot end effector). Moreover, although particular control heads are described above with respect to controlling disparate components of the robot, it should be understood that is for the sake of example and is not meant to be limiting. For instance, a first control head can be associated with controlling a first portion of a first component of the robot (e.g., the orientation of the robot end effector), and a disparate second control head can be associated with controlling a second portion of the first component of the robot (e.g., the actuation state of the robot end effector).

In various implementations, the intermediate representation of the instance of the vision data can be provided as input to an additional control head (also referred to as a failure head) to generate a corresponding set of values associated with performance of the robotic task itself, rather than utilizing the corresponding set of values in controlling the respective components of the robot as described above. The corresponding set of values associated with performance of the robotic task can indicate, for example, whether the robot will continue performance of the robotic task, whether the robot will fail in performance of the robotic task, and/or whether the robot has completed performance of the robotic task. In other words, the robotic control policy can utilize this corresponding set of values to determine whether to prompt the user to intervene in performance of the robotic task. The corresponding set of values associated with performance of the robotic task can be, for example, a vector of values that may be mutually exclusive binary values indicative of whether the robot will continue performance of the robotic task, whether the robot will fail in performance of the robotic task, and/or whether the robot has completed the robotic task, probabilities associated with whether the robot will continue performance of the robotic task, whether the robot will fail in performance of the robotic task, and/or whether the robot has completed performance of the robotic task, and/or other values corresponding to performance of the robotic task. Additionally, or alternatively, the sequence of actions generated using the aforementioned control heads associated with controlling the respective components of the robot can be provided as input to this additional control head.

The above description is provided as an overview of only some implementations disclosed herein. These and other implementations are described in more detail herein, including in the detailed description, the claims, and the figures.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
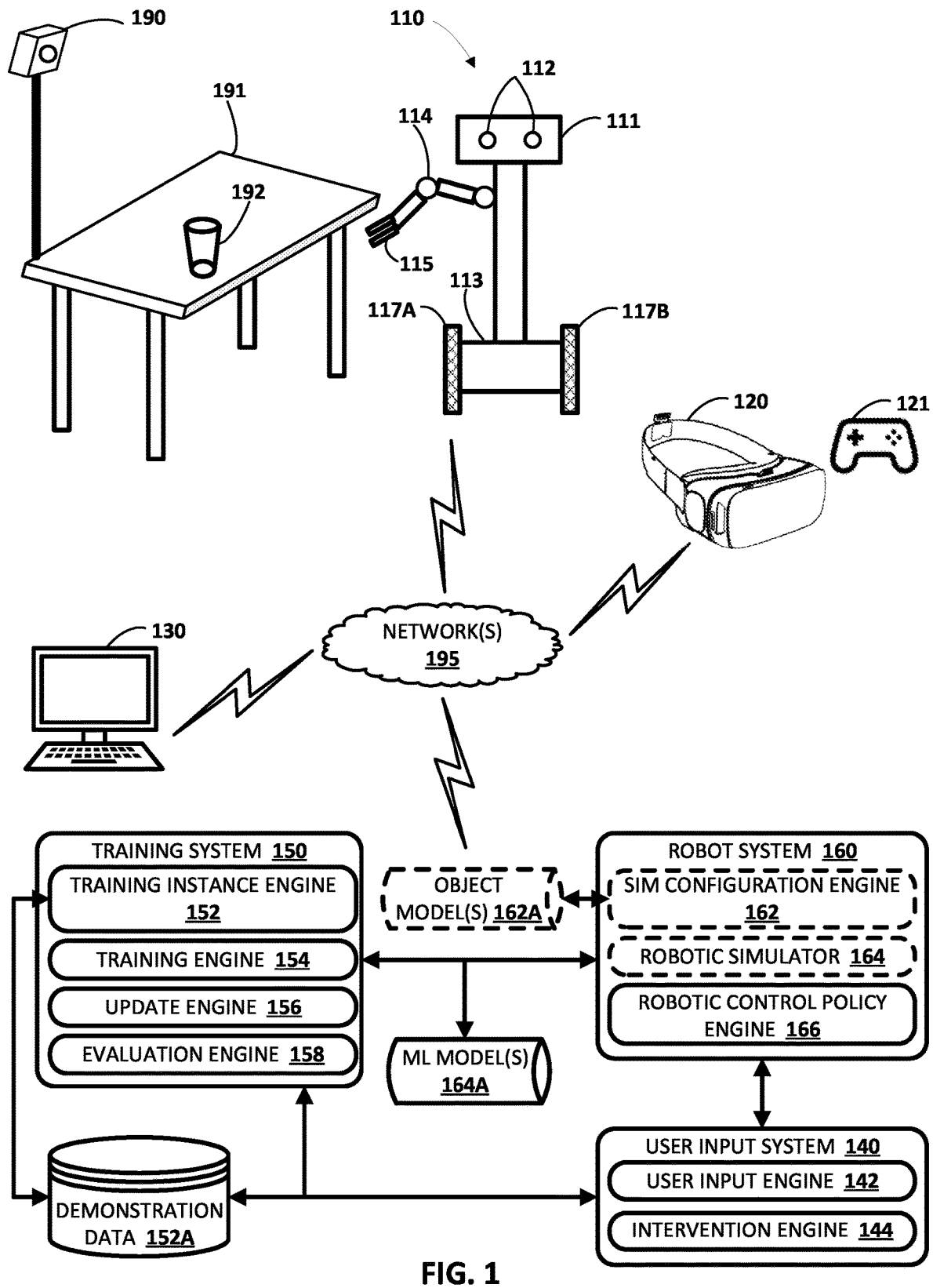
FIG. 1 illustrates an example environment in which implementations disclosed herein can be implemented.

FIG. 1 illustrates an example environment in which implementations disclosed herein can be implemented. The example environment includes a robot 110, a computing device 120, a computing device 130, a user input system 140, a training system 150, and a robot system 160. One or more of these components of FIG. 1 can be communicatively coupled over one or more networks 195, such as local area networks (LANs), wide area networks (WANs), and/or any other communication network. Each of the computing devices 120, 130 can include various input devices and output devices. For example, the computing device 120 takes the form of a virtual or augmented reality headset that can be utilized to render various graphical user interfaces described herein. Further, the computing device 120 may utilize controller 121 as an input device, or simply track eye and/or hand movements of a user of the computing device 120 via various sensors of the computing device 120 to control the robot 110. As another example, the computing device 130 can include a display and various input devices, such as a keyboard and mouse. Although particular components are depicted in FIG. 1 it should be understood that is for the sake of example and is not meant to be limiting. Moreover, although various components of FIG. 1 are depicted as separate in FIG. 1, it should be understood that is for the sake of example and is not meant to be limiting. For example, one or more of the computing devices 120, 130 can implement one or more aspects of the user input system 140, the training system 150, and/or the robot system. Also, for example, one or more aspects of the user input system 140, the training system 150, and/or the robot system can be implemented by a remote system (e.g., server(s)) in communication with one or more of the computing devices 120, 130 over one or more of the networks 195.

A user can utilize the computing devices 120, 130, the user input system 140, the training system, and the robot system 160 to train a robotic control policy for controlling the robot 110 in performance of various robotic tasks. The robotic control policy can correspond to one or more machine learning (ML) ML model(s) stored in ML model(s) database 164A and a system that utilizes output, generated using the ML model(s), in controlling a robot, such as the robot system 160 and/or various engines thereof. As described herein, the techniques described herein relate to training and refining robotic control policies using imitation learning techniques. In particular, the robotic control policy can be initially trained based on demonstration data that is stored in demonstration data database 152A and that is based on human demonstrations of various robotic tasks. Further, and subsequent to the initial training, the robotic control policy can be refined based on human interventions that are received during performance of various robotic tasks by the robot 110. Moreover, and subsequent to the refining, the robotic control policy can be deployed for use in controlling the robot 110 during future robotic tasks.

The robot 110 illustrated in FIG. 1 is a particular real-world mobile robot. However, additional and/or alternative robots can be utilized with techniques disclosed herein, such as additional robots that vary in one or more respects from robot 110 illustrated in FIG. 1. For example, a stationary robot arm, a mobile telepresence robot, a mobile forklift robot, an unmanned aerial vehicle ("UAV"), and/or a humanoid robot can be utilized instead of or in addition to robot 110, in techniques described herein. Further, the robot 110 may include one or more engines implemented by processor(s) of the robot and/or by one or more processor(s) that are remote from, but in communication with, the robot 110.

The robot 110 includes one or more visions component 111 that can generate instances of vision data (e.g., images, point clouds) related to shape, color, depth, and/or other features of object(s) that are in the line of sight of the vision component 111. The instances of the vision data generated by one or more of the vision components can form some or all of state data (e.g., environmental state data and/or robot state data). The robot 110 can also include position sensor(s), torque sensor(s), and/or other sensor(s) that can generate data and such data, or data derived therefrom, can form some or all of state data (if any). Additionally, or alternatively, one or more vision components 190 that can generate the instances of the vision data may be located external from the robot 110.

One or more of the vision components 111, 190 may be, for example, a monocular camera, a stereographic camera (active or passive), and/or a light detection and ranging (LIDAR) component. A LIDAR component can generate vision data that is a 3D point cloud with each of the points of the 3D point cloud defining a position of a point of a surface in 3D space. A monocular camera may include a single sensor (e.g., a charge-coupled device (CCD)), and generate, based on physical properties sensed by the sensor, images that each includes a plurality of data points defining color values and/or grayscale values. For instance, the monocular camera may generate images that include red, blue, and/or green channels. A stereographic camera may include two or more sensors, each at a different vantage point, and can optionally include a projector (e.g., infrared projector). In some of those implementations, the stereographic camera generates, based on characteristics sensed by the two sensors (e.g., based on captured projection from the projector), images that each includes a plurality of data points defining depth values and color values and/or grayscale values. For example, the stereographic camera may generate images that include a depth channel and red, blue, and/or green channels.

The robot 110 also includes a base 113 with wheels 117A, 117B provided on opposed sides thereof for locomotion of the robot 110. The base 113 may include, for example, one or more motors for driving the wheels 117A, 117B of the robot 110 to achieve a desired direction, velocity, and/or acceleration of movement for the robot 110.

The robot 110 also includes one or more processors that, for example: provide control commands to actuators and/or other operational components thereof (e.g., robotic control policy engine 166 as described herein). The control commands provided to actuator(s) and/or other operational component(s) can form part of the action data (if any) that is included in the episode data 162.

The robot 110 also includes robot arm 114 with end effector 115 that takes the form of a gripper with two opposing "fingers" or "digits." Additional and/or alternative end effectors can be utilized, or even no end effector. For example, alternative grasping end effectors can be utilized that utilize alternate finger/digit arrangements, that utilize suction cup(s) (e.g., in lieu of fingers/digits), that utilize magnet(s) (e.g., in lieu of fingers/digits), etc. Also, for example, a non-grasping end effector can be utilized such as an end effector that includes a drill, an impacting tool, etc.

As noted above, a robotic control policy can be initially trained based on human demonstrations of various robotic tasks. As the human demonstrations are performed, demonstration data can be generated via the user input system 140, and can be stored in demonstration data database 152A. The demonstration data can include, for example, instances of vision data generated by one or more of the vision components 112, 190 during performance of a given human demonstration of a given robotic task, state data of the robot 110 and/or the environment corresponding to the instances of the vision data captured during the given human demonstration of the given robotic task, corresponding sets of values for controlling respective components of the robot 110 corresponding to the instances of the vision data captured during the given human demonstration. For example, user input engine 142 can detect user input to control the robot 110, and intervention engine 144 can generate the corresponding sets of values for controlling the respective components of the robot 110. The corresponding sets of values utilized in controlling a respective component of the robot 110 can be, for example, a vector that describes a translational displacement and/or rotation (e.g., a sine-cosine encoding of the change in orientation about an axis of the respective component) of the respective component, lower-level control command(s) (e.g., individual torque commands that control corresponding actuator(s) of the robot 110, individual joint angles of component(s) of the robot, etc.), binary values for component(s) of the robot (e.g., indicative of whether a robot gripper should be opened or closed), other values for component(s) of the robot 110 (e.g., indicative of an extent to which the robot gripper 115 should be opened or closed), velocities and/or accelerations of component(s) of the robot 110 (e.g., robot arm movement, robot base movement, etc.), and/or other values that can be utilized to control the robot 110.

In some implementations, a human (or user) can utilize one or more of the computing devices 120, 130 (or input devices thereof) to control the robot 110 to perform the human demonstrations of the robotic tasks. For example, the user can utilize the controller 121 associated with the computing device 120 to control the robot 110, an input device associated with the computing device 130 to control the robot, or any other input device of any computing device in communication with the robot 110, and the demonstration data can be generated based on the instances of the vision data captured by one or more of the vision components 112, 190, and based on the user control the robot 110. In additional or alternative implementations, the user can physically manipulate the robot 110 or one or more components thereof (e.g., the base 113, the robot arm 114, the end effector 115, and/or other components). For example, the user can physically manipulate the robot arm 114, and the demonstration data can be generated based on the instances of the vision data captured by one or more of the vision components 112, 190, and based on the physical manipulation of the robot 110. The user can repeat this process to generate demonstration data for performance of various robotic tasks.

In some implementations, the human demonstrations can be performed in a real-world environment using the robot 110. For example, in the environment depicted in FIG. 1, the user can control the robot 110 to perform a motion task by causing the robot 110 to traverse towards a table 191, and perform a grasping task by causing the robot 110 to pick up a cup 192. In additional or alternative implementations, the human demonstrations can be performed in a simulated environment using a simulated instance of the robot 110 via a robotic simulator 164. For example, in implementations where the human demonstrations are performed in the simulated environment using a simulated instance of the robot 110, sim configuration engine 162 can access object model(s) database 162A to obtain a simulated instance of the table 191 and a simulated instance of the cup 192. Further, the user can control the simulated instance of the robot 110 to perform a simulated motion task by causing simulated instance of the robot 110 to traverse towards the simulated instance of the table 191, and perform a simulated grasping task by causing the simulated instance of the robot 110 to pick up the simulated instance of the cup 192.

In some implementations, the robotic simulator 164 can be implemented by one or more computer systems, and can be utilized to simulate various environments that include corresponding environmental objects (e.g., using the sim configuration engine 162), to simulate an instance the robot 110 operating in the simulated environment depicted in FIG. 1 and/or other environments, to simulate responses of the robot in response to virtual implementation of various simulated robotic actions in furtherance of various robotic tasks, and to simulate interactions between the robot and the environmental objects in response to the simulated robotic actions. Various simulators can be utilized, such as physics engines that simulate collision detection, soft and rigid body dynamics, etc. Accordingly, the human demonstrations and/or performance of various robotic tasks described herein can include those that are performed by the robot 110, that are performed by another real-world robot, and/or that are performed by a simulated instance of the robot 110 and/or other robots via the robotic simulator 164.

Training instance engine 152 can utilize the demonstration data stored in the demonstration data database 152A to generate a plurality of training instances for bootstrapping a robotic control policy. Notably, the plurality of training instances can be generated based on single human demonstration or multiple human demonstrations (e.g., as described with respect to FIG. 4). Each of the plurality of training instances include training instance input and corresponding training instance output. The training instance input can include, for example, an instance of vision data, state data when the instance of the vision data was captured (e.g., environmental state data and/or robot state data of the robot 110), force value(s) of various components of the robot 110 when the instance of the vision data was captured, and/or other sensor data generated when the instance of the vision data was captured. The training instance output can include, for example, ground truth corresponding sets of values for respective components of the robot that are associated with the instance of the vision data (and optionally subsequent instances of the vision data that are subsequent to the instance of the vision data). For example, the training instance input can include an instance of vision data capturing a robot arm performing an object manipulation task (e.g., based on human control of the robot arm), and the training instance output can include ground truth corresponding sets of values for a robot arm and a robot end effector that correspond to values utilized by the robot in performance of the object manipulation task.

In some implementations, the training instance output can include the corresponding sets of values for the respective components of the robot 110 utilized to implement an action based on the instance of the vision data, and can also include additional corresponding sets of values associated with next actions that follow the action based on the instance of the vision data. In other words, the training instance output can include corresponding sets of values associated with a sequence of actions that are performed by the robot during the human demonstration. By including not only the corresponding sets of values for the action corresponding to the instance of the vision data included in the training input, but also the corresponding sets of values for one or more next actions that follow the action, the robotic control policy can be trained to generate the sequence of actions. As described herein, at inference (e.g., in an autonomous mode described herein), the robotic control policy may only generate the next action (and not one or more next actions that follow the action). However, by training the robotic control policy to generate the one or more next actions, the action that is generated for implementation by the robot 110 can be generated in view of the robotic task as a whole, rather than seemingly discrete actions. For example, assume the robotic task is a grasping task and the robot gripper 115 needs to move to the left in the environment towards an object to be grasped. In this example, the action generated using the robotic control policy can include moving the robot gripper 115 to the left even if it may not immediately impact performance of the grasping task. For instance, the robot gripper 115 may move forward and still accomplish the task. However, generating an action that causes the robot gripper 115 to move towards the left, rather than forward or right, is the best action for the robot 110 to implement in furtherance of the robotic task. Moreover, this may mitigate jerky movements of the robot 110 and result in smoother performance of the robotic task in terms of kinematic motion of respective components of the robot 110. In these and other manners, the robotic control policy can be bootstrapped based on the demonstration data generated based on the human demonstrations.

In some implementations, one or more of the plurality of training instances may be labeled. The labels can indicate whether a given training instance, of the plurality of training instances, is a positive training instance or a negative training instance. For example, training instances that include the user correctly performing a given robotic task can be labeled as positive training instances, whereas training instances that include the user incorrectly performing the given robotic task can be labeled as negative training instances. For instance, if the demonstration data corresponds to the user correctly grasping an object, then the training instance can be labeled as a positive training instance. However, if the demonstration data corresponds to the user incorrectly grasping an object, bumping into an object, etc., then the training instance can be labeled as a negative training instance. By using labeled training instances in these and other manners, a robotic control policy can be trained in a more efficient manner, and also results in a trained robotic control policy having greater precision and/or recall. For example, a robotic control policy trained based on labeled training instances can predict, in various implementations, when the robot will fail in performance of a robotic task.

Training engine 154 can utilize the plurality of training instances generated by the training instance engine 152 to bootstrap a robotic control policy. As used herein, a robotic control policy refers to machine learning (ML) model(s) (e.g., stored in ML model(s) database) and a system that utilizes output, generated using the ML model(s), in controlling the robot 110. The training engine 152 can train a given robotic control policy to generate a sequence of actions based on processing an instance of vision data (and optionally other data described herein) for a given training instance input. The sequence of actions can include a next action to be performed by the robot 110 in furtherance of the robotic task and a sequence of predicted actions that are predicted to follow the next action. In some implementations, training engine 152 can further utilize the state data for the given training instance input in generating the sequence of actions, but it should be understood that the sequence of actions described herein may be generated exclusively based on the instances of the vision data. Moreover, although techniques are described herein with respect to generating a sequence of actions, it should be understood that is for the sake of example and is not meant to be limiting. For instance, the techniques described herein may be utilized to generate the next action without generating any sequence of predicted actions that are predicted to follow the next action.

The ML model(s) representing the robotic control policy can include one or more input layers, a plurality of intermediate layers, and a plurality of disparate control heads. For example, and referring briefly to FIG. 2A, the training engine 154 can cause an instance of vision data 201A (and optionally a corresponding instance of state data 201B) can be provided as input to one or more input layers 211, and one or more intermediate layers 212 can process the instance of the vision data 201A to generate an intermediate representation of the instance of the vision data 202 (e.g., an embedding, an encoding, etc.). In some implementations, one or more of the input layers 211 can perform one or more data processing functions on the instance of the vision data 201A and/or the instance of the state data 201B (e.g., concatenation and/or other functions) prior to providing the instance of the vision data 201A and/or the instance of the state data 201B to one or more of the intermediate layers 212.

Further, the intermediate representation of the instance of the vision data 202 can be provided as input to a plurality of disparate control heads 213. In some implementations, each of the plurality of disparate control heads 213 can be utilized to generate corresponding sets of values for controlling respective components of the robot 110. For example, a first control head $213_1$ can be used to generate a corresponding first set(s) of values $203_1$ that reflect a translational displacement (e.g., two-dimensional or three-dimensional) the robot gripper 114 for one or more of the actions included in the sequence of actions; a second control head $213_2$ can be used to generate corresponding second set(s) of values $203_2$ that reflect an orientation of the robot gripper 115 for one or more of the actions included in the sequence of actions; a third control head $213_3$ can be used to generate a corresponding third set(s) of values $203_3$ that reflect an actuation state robot gripper 115 (or an extent of the actuation state of the robot end effector) for one or more of the actions included in the sequence of actions; a fourth control head $203_4$ can be used to generate a corresponding first set(s) of values $203_1$ that reflect the robot base 113 velocity and/or acceleration (or for the individual wheels 117A, 117B) for one or more of the actions included in the sequence of actions; and so on for an Nth control head $213_N$ that is used to generate corresponding Nth set(s) of values $203_N$, where N is a positive integer. Although particular control heads associated with particular components of the robot 110 are described above, it should be understood that is for the sake of example and is not meant to be limiting, and that the plurality of control heads 213 utilized by the robotic control policy may be a function of the components of the robot 110 performing the robotic task. For instance, if the robot does not include the robot base 113 (e.g., a stationary robot arm), then a given control head associated with the robot base 113 may not be utilized. Also, for instance, if the robot includes robot legs, rather than the robot base 113, a control head associated with one or more robot legs can be utilized in lieu of a control head for the robot base 113. Moreover, although particular control heads are described above with respect to controlling disparate components of the robot, it should be understood that is for the sake of example and is not meant to be limiting. For instance, a first control head can be associated with controlling a first portion of a first component of the robot (e.g., the second control head $213_2$ described above with respect to the orientation of the robot gripper 115), and a disparate second control head can be associated with controlling a second portion of the first component of the robot (e.g., the third control head $213_3$ described above with respect to the actuation state of the robot gripper 115).

In various implementations, the intermediate representation of the instance of the vision data 202 can be provided as input to an additional control head (also referred to as a failure head) to generate a corresponding set of values associated with performance of the robotic task itself, rather than utilizing the corresponding set of values in controlling the respective components of the robot 110 as described above. The corresponding set of values associated with performance of the robotic task can indicate, for example, whether the robot 110 will continue performance of the robotic task, whether the robot 110 will fail in performance of the robotic task, and/or whether the robot 110 has completed performance of the robotic task. In other words, the robotic control policy can utilize this corresponding set of values to determine whether to prompt the user to intervene in performance of the robotic task. The corresponding set of values associated with performance of the robotic task can be, for example, a vector of values that may be mutually exclusive binary values indicative of whether the robot 110 will continue performance of the robotic task, whether the robot 110 will fail in performance of the robotic task, and/or whether the robot 110 has completed the robotic task, probabilities associated with whether the robot 110 will continue performance of the robotic task, whether the robot 110 will fail in performance of the robotic task, and/or whether the robot 110 has completed performance of the robotic task, and/or other values corresponding to performance of the robotic task. For example, the corresponding set of values generated using this failure head can include a vector of values for [fail, continue, complete] where each value of the vector is a binary value that is indicative of performance of the robotic task. As another example, the corresponding set of values generated using this failure head can include a vector of values for [fail/continue, complete] where the "fail/continue" value is a probability associated with whether the robot 110 will fail, and the "complete" value is a binary value associated with whether the robot 110 has completed performance of the robotic task.

In some implementations, update engine 156 can generate one or more one or more losses, and utilize one or more of the losses to update the control heads 213. In some of those implementations, one or more (e.g., all) of the losses can be generated utilizing a loss function that is different from one or more (e.g., all) of the loss functions utilized in generating the other losses. As one particular example, a first loss utilized to update a first control head of the robotic control policy can be generated based on comparing a first corresponding set of values to a corresponding alternative first set of values for the next action and/or for one or more of the plurality of additional predicted actions, a second loss utilized to update a second control head of the robotic control policy can be generated based on comparing a second corresponding set of values to a corresponding alternative second set of values for the next action and/or for one or more of the plurality of additional predicted action, and so on for each of the control heads utilized in controlling the various components of the robot. In this example, a first loss function can be utilized to generate the first loss, and a distinct second loss function can be utilized to generate the second loss. Further, the respective losses can be utilized to update the respective control heads.

Figure 2A:
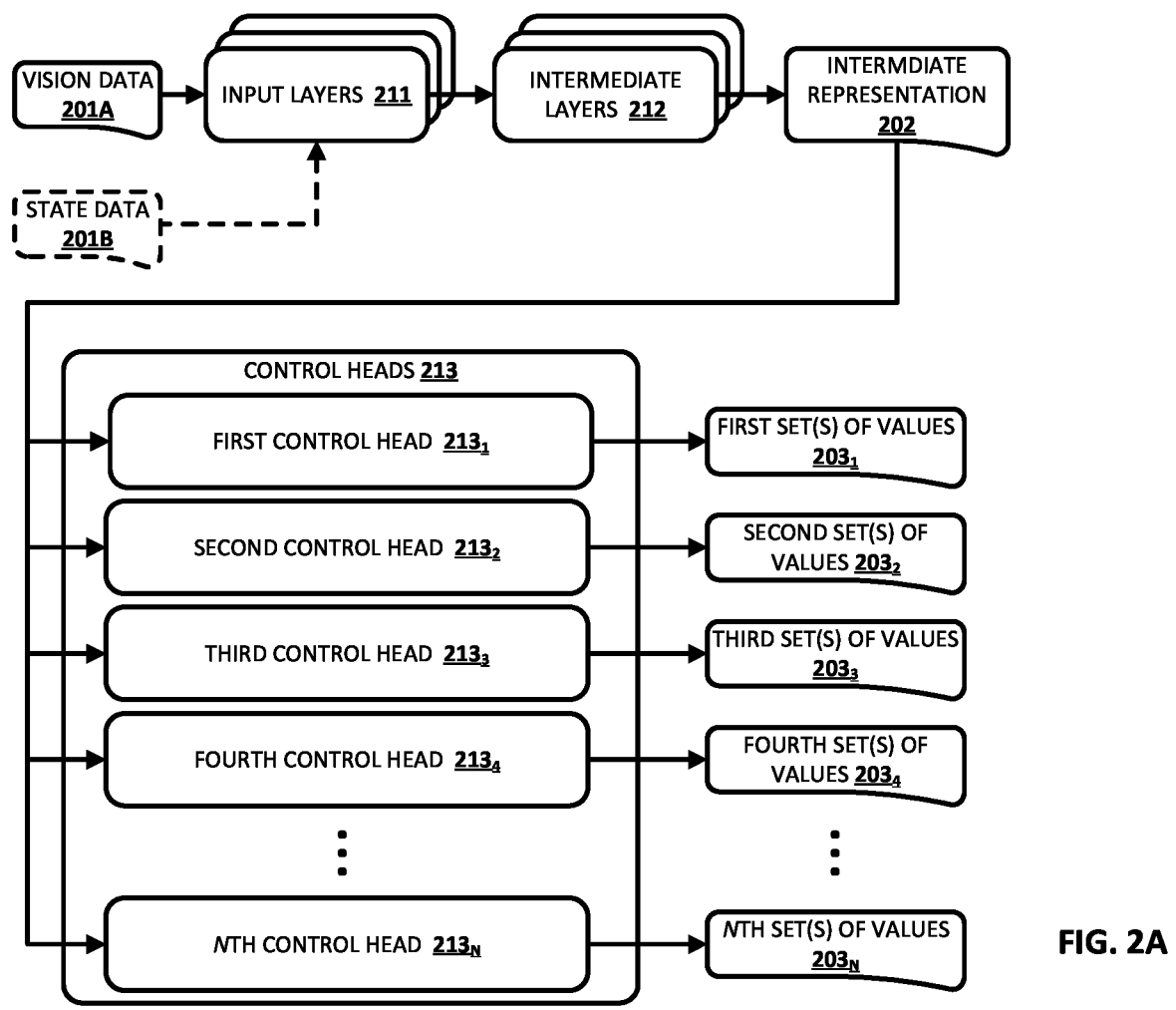
FIG. 2A depicts a representation of robotic control policy, according to implementations disclosed herein.
Figure 2B:
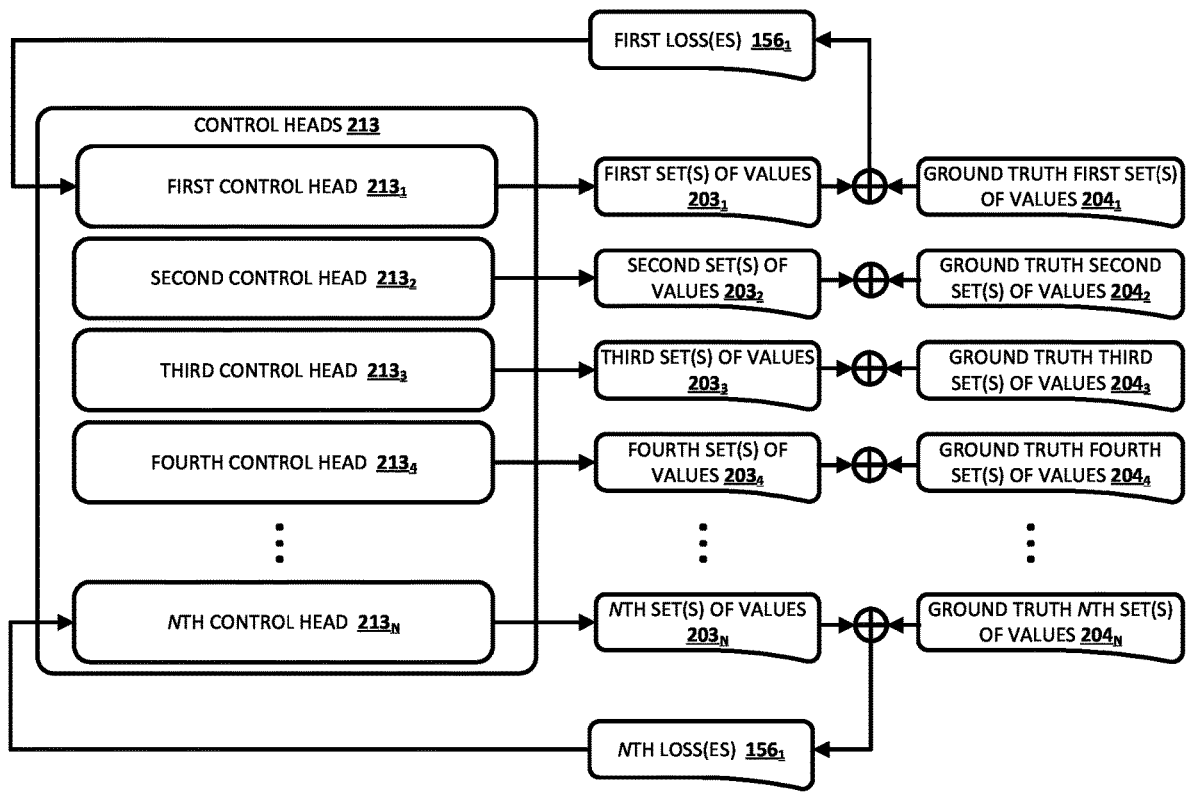
FIG. 2B depicts a representation of various updating control heads of a robotic control policy, according to implementations disclosed herein.

For example, and referring briefly to FIG. 2B, the update engine 156 can generate: one or more first losses $156_1$ based on comparing the corresponding first set of value(s) $203_1$ to respective ground truth corresponding first set(s) of values $204_1$ for the given training instance; one or more second losses based on comparing the corresponding second set of value(s) $203_2$ to respective corresponding second set(s) of values $204_2$ for the given training instance; one or more third losses based on comparing the corresponding third set of value(s) $203_3$ to respective ground truth corresponding third set(s) of values $204_3$ for the given training instance; one or more fourth losses based on comparing the corresponding fourth set of value(s) $203_3$ to respective ground truth corresponding fourth set(s) of values $204_4$ for the given training instance; and so on for one or more Nth losses $156_N$. The update engine 156 can subsequently utilize the respective losses to update the respective control heads 213. Notably, various loss functions can be utilized in generating the one or more losses for each of the control heads. For example, one or more of the first losses can be generated using a mean squared error loss function, one or more of the second losses can be generated using a mean squared error loss function and/or a quaternion norm loss function, one or more of the third losses can be generated using a log loss function, and so on. The training engine 154 can repeat this process for a plurality of additional training instances. Although only the one or more first losses $156_1$ and the one or more Nth losses $156_N$ are depicted in FIG. 2B as being utilized to update their respective control heads, it should be understood that is for the sake of clarity and is not meant to be limiting.

In some implementations, and referring back to FIG. 1, evaluation engine 158 can evaluate the robotic control policy and determine whether to transition from a bootstrapping mode (e.g., training the robotic control policy based on the plurality of training instances as described above) to a semi-autonomous mode to further refine the robotic control policy. The evaluation engine 158 can determine whether to transition from the bootstrapping mode to the semi-autonomous mode when one or more conditions are satisfied. The one or more conditions can include, for example, occurrence of training based on at least a threshold quantity of training instances, a threshold duration of training based on the training instances, and/or other conditions described herein.

In the semi-autonomous mode, RCP engine 166 can utilize the trained robotic control policy to control the robot 110 in performance of various robotic tasks. In some implementations, the robot 110 may initiate performance of a robotic task in response to receiving user input to initiate performance of the robotic task. For example, the user can provide user input at one of the computing devices 120, 130 or the robot 110 itself to initiate performance of a robotic task. In some implementations, the RCP engine 166 can utilize the robotic control policy to control the robot in performance of the robotic task by processing instances of vision data to generate one or more actions to be performed, and the robot 110 can autonomously perform one or more of the actions. In some versions of those implementations, the user may be prompted to intervene in performance of the robotic task when the RCP engine 166 determines that the robot 110 has failed in performance of the robotic task and/or is predicted to fail in performance of the robotic task.

For example, assume the robot 110 is performing a robotic task of opening a latched door that requires the robot 110 to traverse a path to the latched door using the robot base 113, manipulate a door handle via the robot gripper 115 coupled to the robot arm 114, and traverse another path to push or pull the door to an open position. In this example, the RCP engine 166 can process, using the robotic control policy, an instance of vision data generated by one or more of the vision components 112 to generate a sequence of actions for a first iteration. The sequence of actions can include an initial action and a plurality of predicted actions that are predicted to follow the initial action. Further, each of these actions can be associated with corresponding sets of values for controlling respective components of the robot 110. Notably, a representation of the sequence of actions can be provided for presentation to a human via a graphical user interface of one of the computing devices 120, 130 (e.g., described with respect to FIGS. 3B and 3C). Assuming that the RCP engine 166 determines that the robot 110 will not fail in performance of the robotic task based on processing of the instance of the vision data using the failure head (and optionally along with the sequence of actions), the robot can utilize the corresponding sets of values to perform the initial action in furtherance of the robotic task of opening the latched door. Further, the RCP engine 166 can process, using the robotic control policy, an additional instance of the vision data generated by one or more of the vision components 112 to generate an additional sequence of actions for a second iteration. The additional sequence of actions can include a next action and a plurality of additional predicted actions that are predicted to follow the next action. An additional representation of the additional sequence of actions can be provided for presentation to the human via the graphical user interface of one of the computing devices 120, 130 (e.g., described with respect to FIGS. 3B and 3C). The RCP engine 166 can continue until performance of the robotic task is completed.

However, in implementations where the RCP engine 166 determines, using the robotic control policy, that the robot will fail in performance of the robotic task based on processing of the instance of the vision data or the user proactively intervenes in performance of the robotic task, the user can be prompted to intervene in performance of the robotic task of opening the latched door. The prompt can be generated using the intervention engine 144. In this example, the user can provide user input via an input device of one of the computing devices 120, 130 (e.g., controller 121) to control the robot 110 responsive to receiving the prompt. In some implementations, and based on the user input, the intervention engine 144 can generate alternative sets of corresponding values for controlling respective components of the robot 110. The update engine 156 can utilize these alternative sets of corresponding values for controlling various components of the robot 110 can be utilized in generating one or more losses for updating the robotic control policy (e.g., in the same or similar manner described with respect to FIG. 2B). For example, assume the user was prompted to intervene in performance of the robotic task. In this example, the corresponding sets of values generated across the disparate control heads can be compared to the alternative corresponding sets of values generated by the intervention engine 144 based on the user input. The comparison(s) can be used to generate one or more losses, and the robotic control policy (or the ML model(s) can be updated based on one or more of the losses. In some implementations, a corresponding loss can be determined for each of multiple control heads and the corresponding loss utilized to update the corresponding control head. In implementations where the human intervenes in performance of the robotic task, such as when the user believes the robot will continue traversing the path through the door without stopping to open the door, one or more losses can be generated in the same or similar manner and utilized to update the control heads.

In some implementations, the evaluation engine 158 can evaluate the refined robotic control policy and determine whether to transition from the semi-autonomous mode to an autonomous mode to validate the robotic control policy. The evaluation engine 158 can determine whether to transition from the semi-autonomous mode to the autonomous when one or more conditions are satisfied. The one or more conditions can include, for example, convergence of the robotic control policy (e.g., zero loss(es) or within a threshold range of zero loss(es)), determination that the robotic control policy performs better (e.g., with respect to precision and/or recall) than the instance of the robotic control policy currently being utilized (if any), occurrence of refining based on at least a threshold quantity of human interventions, and/or a threshold duration of refining in the semi-autonomous mode.

In the autonomous mode, the RCP engine 166 can also utilize the trained robotic control policy to control the robot 110 in performance of various robotic tasks. However, and in contrast with the semi-autonomous mode, the user may not be prompted to intervene in performance of robotic tasks. Rather, the robot 110 is able to mitigate failure and/or recover from failure in performance of various robotic tasks by virtue of the robotic control policy being trained and refined using the techniques described herein. For example, if the RCP engine 166 determines that a next action to be performed will result in the robot 110 colliding with an obstacle, the RCP engine 166 can avoid performing the next action, and implement a different next action to be performed by the robot 110 at a subsequent iteration.

By using the techniques described herein, various technical advantages can be achieved. As one non-limiting example, by prompting a user to intervene with performance of a robotic task when it is determined the robot 110 will fail in performance of the robotic task, the robotic control policy is trained to learn how to perform the robotic task and how to recover from failure in performance of the robotic task, rather than simply being trained to learn how to perform the robotic task. As a result, the user may be prompted to intervene less frequently as the robotic control policy is trained when compared to other known techniques, thereby conserving computational resources, network resources, and/or robot resources. As another non-limiting example, by enabling the human to intervene based on visual representations of actions the robot may perform, collisions with various obstacles in an environment of the robot 110 may be avoided. As a result, any potential damage to these obstacles and the robot can be mitigated or avoided completely. As another non-limiting example, by using the architecture described herein, each of the control heads that are dedicated to respective components (or portions of the respective components) of the robot 110 can be refined based on one or more losses that are specific to those control heads. As a result, the robotic control policy can be trained in a quicker and more efficient manner and based on fewer human demonstrations by the user.

Figure 3A:
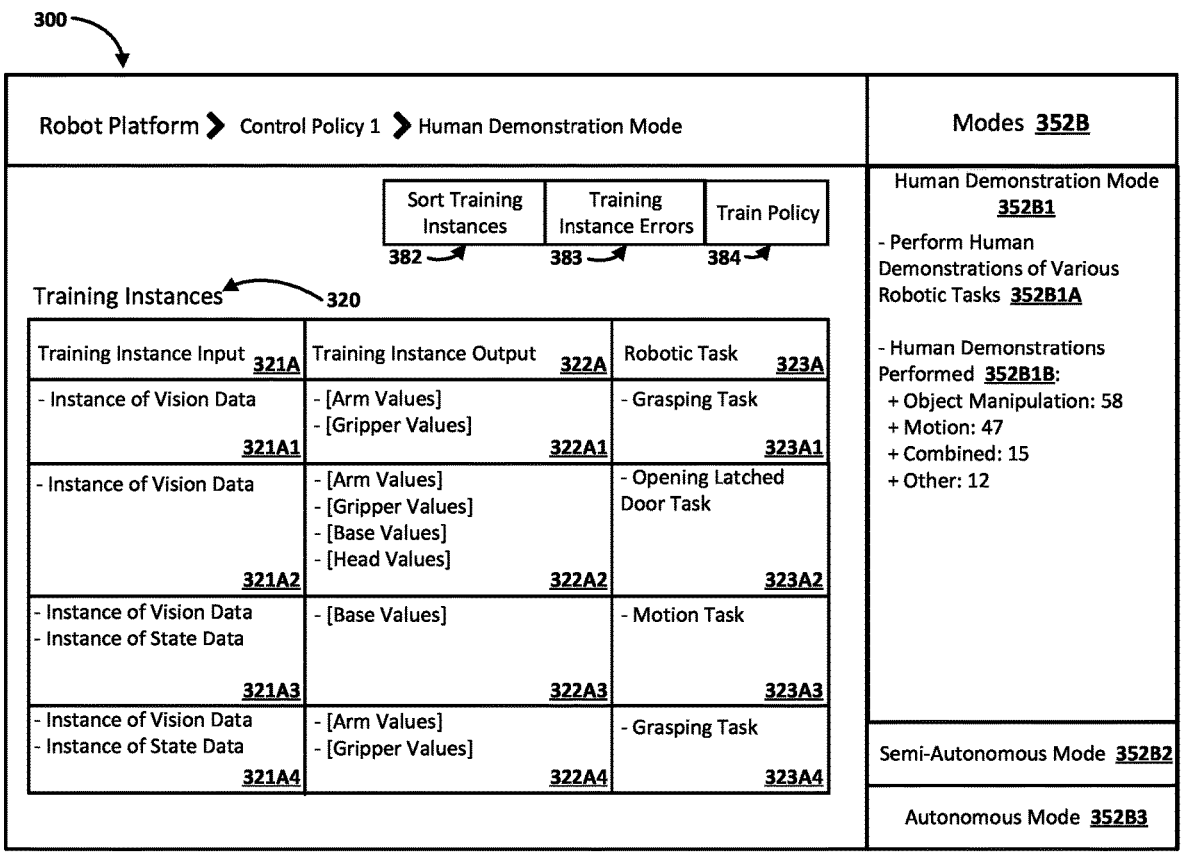
FIG. 3A, FIG. 3B, and FIG. 3C depicts various non-limiting examples of a graphical user interface of a platform utilized in training and refining robotic control policies, according to implementations disclosed herein.
Figure 3B:
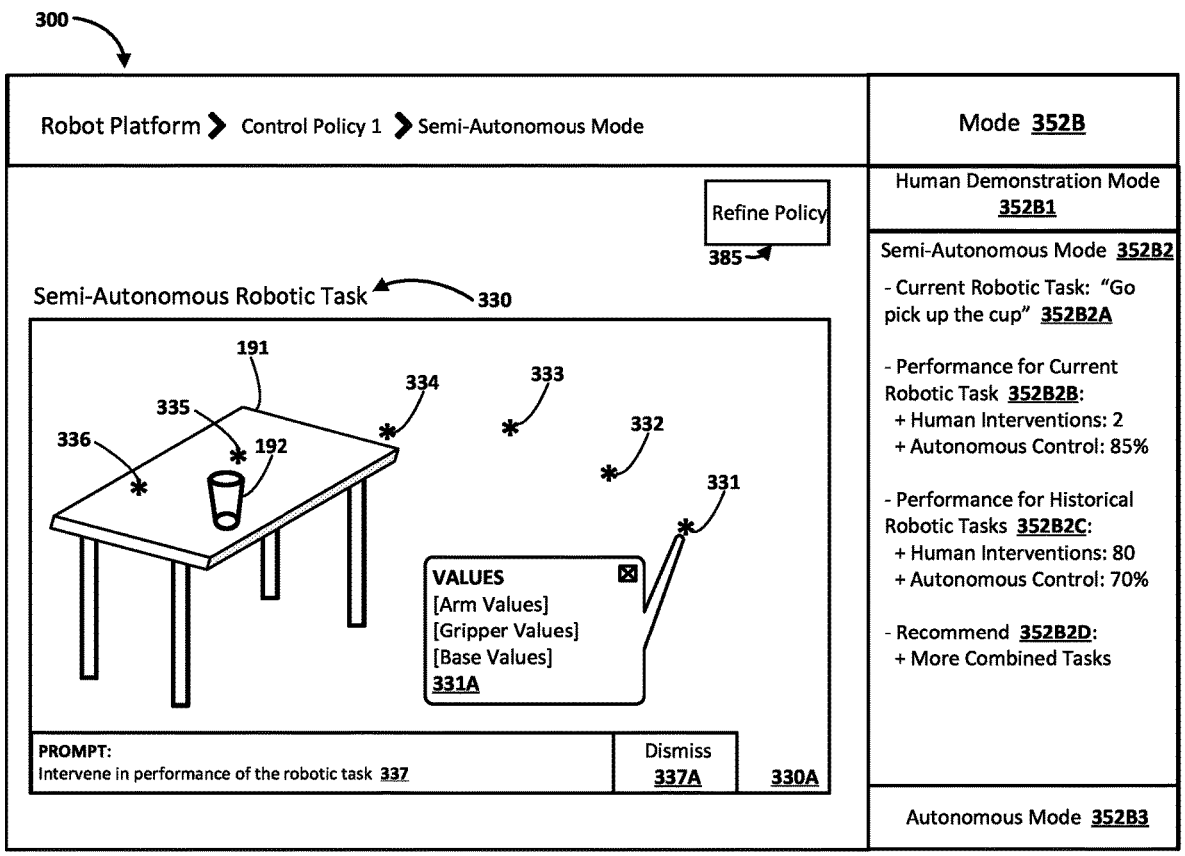
Figure 3C:
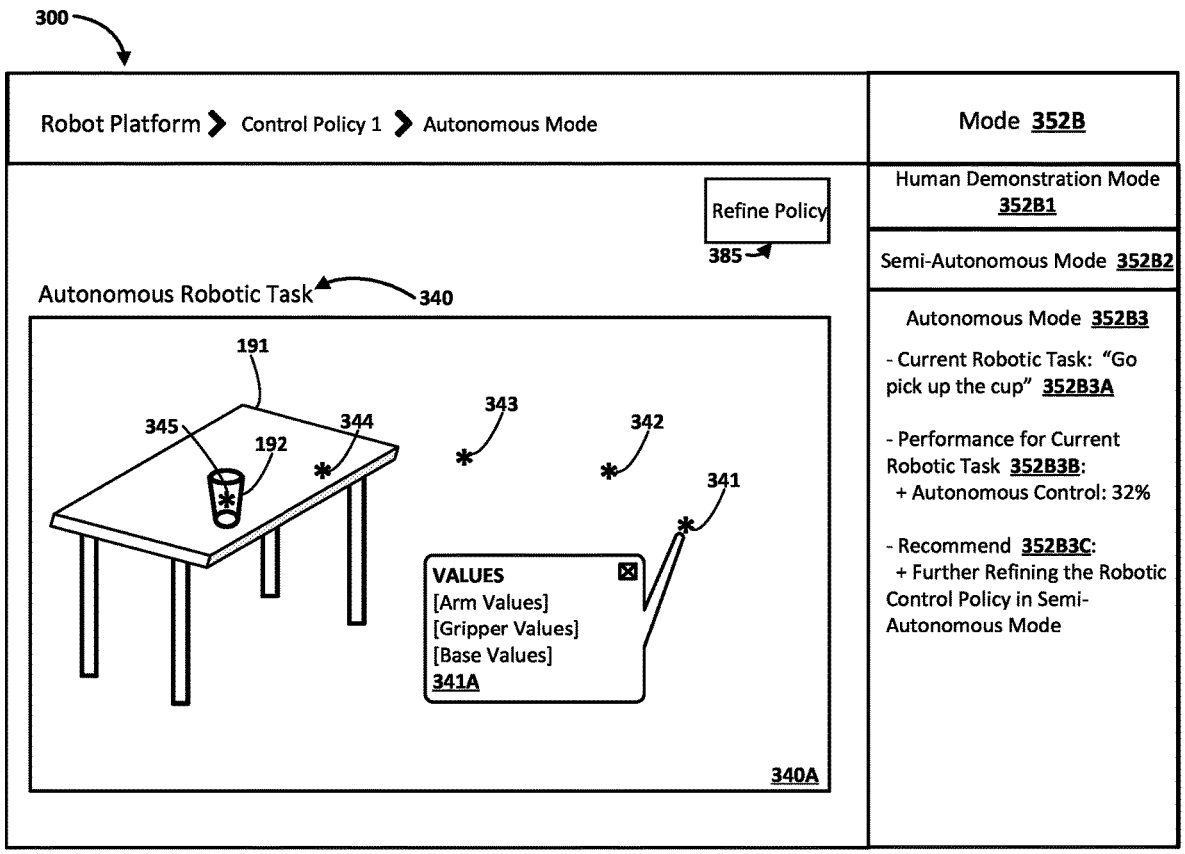

Turning now to FIGS. 3A-3C, various non-limiting examples of a graphical user interface 300 of a platform utilized in training and refining robotic control policies are depicted. A user can interact with the platform to train and refine robotic control policies. The platform can be implemented, at least in part, by a computing device (e.g., one or more of the computing devices 120, 130 of FIG. 1, server(s), and/or other computing devices), and can include, for example, a graphical user interface 300, input devices, and/or output devices. For example, the platform can enable the user to create or select a robotic control policy, and initially bootstrap the robotic control policy based on human demonstrations stored in one or more databases (e.g., the demonstrations data database 152A of FIG. 1) and/or generated as the user interacts with robot(s) in a human demonstration mode 352B1 (e.g., described with respect to FIG. 3A). Further, the platform can enable the user to transition control of the robot(s) from the human demonstration mode 352B1 to a semi-autonomous mode 352B2 to further refine the robotic control policy (e.g., described with respect to FIG. 3B). Moreover, the platform can enable the user to transition control of the robot(s) from the semi-autonomous mode 352B2 to an autonomous mode 352B3 to further evaluate the robotic control policy (e.g., described with respect to FIG. 3C). In some implementations, the user can transition between these various modes 352B by selecting corresponding graphical elements provided for display at the graphical user interface 300 of the platform. In additional or alternative implementations, the platform can automatically transition between these modes 352B based on evaluating performance of the robotic control policy.

In some implementations, and referring specifically to FIG. 3A, the human demonstration mode 352B1 can be utilized to bootstrap a robotic control policy based on human demonstrations. For example, a human demonstrator can use teleoperation to control a robot, kinesthetically manipulation the robot, and/or utilize other techniques to demonstrate how the robot should perform the task. Training instances 320 can be generated based on the human demonstrations, and each of the training instances can include training instance input 322A and training instance output 323A. The training instance input 321A can include, for example, an instance of vision data and/or state data when the instance of the vision data was captured (e.g., environmental state data and/or robot state data) as indicated by various training instance inputs 321A1, 321A2, 321A3, and 321A4 depicted in FIG. 3A (and optionally other data as described herein, such as force value(s) for various components of the robot when the instance of the vision data was captured). The training instance output 322A can include, for example, corresponding sets of values for respective components of the robot that are associated with the human demonstration as indicated by various training instance outputs 322A1, 322A2, 322A3, and 322A4 depicted in FIG. 3A. Notably, the corresponding sets of values included in the training instance output 322A may include corresponding sets of values for multiple actions performed by the robot subsequent to the instance of the vision data being captured. In some implementations, each of the training instances 320 can be associated with a particular robotic task 323A as indicated by various robotic tasks 323A1, 323A2, 323A3, and 323A4 depicted in FIG. 3A. For example, the training instance input 321A1 can include an instance of vision data capturing a robot arm performing an object manipulation task (e.g., a grasping task as indicated by 323A1), and the training instance output 321A1 can include at least corresponding sets of values for a robot arm and a robot end effector (e.g., a robot gripper) that correspond to values utilized by the robot in performance of the object manipulation task.

The platform can instruct the user to perform various tasks to guide the user in training the robotic control policy in the human demonstration mode 352B1. For example, the platform can provide an indication that the user should perform human demonstrations of various robotic tasks at 352B1A. Further, the platform can include a log of human demonstrations performed at 352B1B. In this example, the platform indicates that 58 human demonstrations of object manipulation tasks have been performed, 47 human demonstrations of motion tasks have been performed, 15 human demonstrations of combined tasks have been performed, and 12 human demonstrations of other tasks have been performed. The training instances 320 shown in FIG. 3A can be generated based on these human demonstrations.

In some implementations, the training instances 320 can be sorted based on one or more criteria. The one or more criteria can include can include, for example, a type of robotic task associated with a given training instance (e.g., grasping task, motion task, etc.), a type of training instance output (e.g., corresponding sets of values associated with specific robot components), a type of training instance (e.g., positive or negative), and/or other criteria. For example, in response to a selection of a sort training instances graphical element 382, the platform can cause the training instances 320 to be sorted based on one or more of the criteria. The sort training instances graphical element 382, when selected, can optionally cause a dropdown menu with various criteria for sorting the training instances to be visually rendered at the graphical user interface 300.

In some implementations, one or more of the training instances 320 may include one or more errors. The one or more errors can include, for example, mislabeled training instances (e.g., positive training instance or negative training instance), insufficient vision data and/or state for the training instance input 321A, insufficient corresponding sets of values for the training instance output 322A, and/or other errors. In these implementations, the user can view the training instances 320 that include errors, and can cause one or more actions to be performed to current one or more of the errors. For example, in response to a selection of a training instance errors graphical element 383, the platform can cause the training instances 320 that include one or more errors to be presented to the user. The user can then relabel one or more of these training instances, discard one or more of these training instances, and/or perform any other action to address one or more of the errors.

Figure 4:
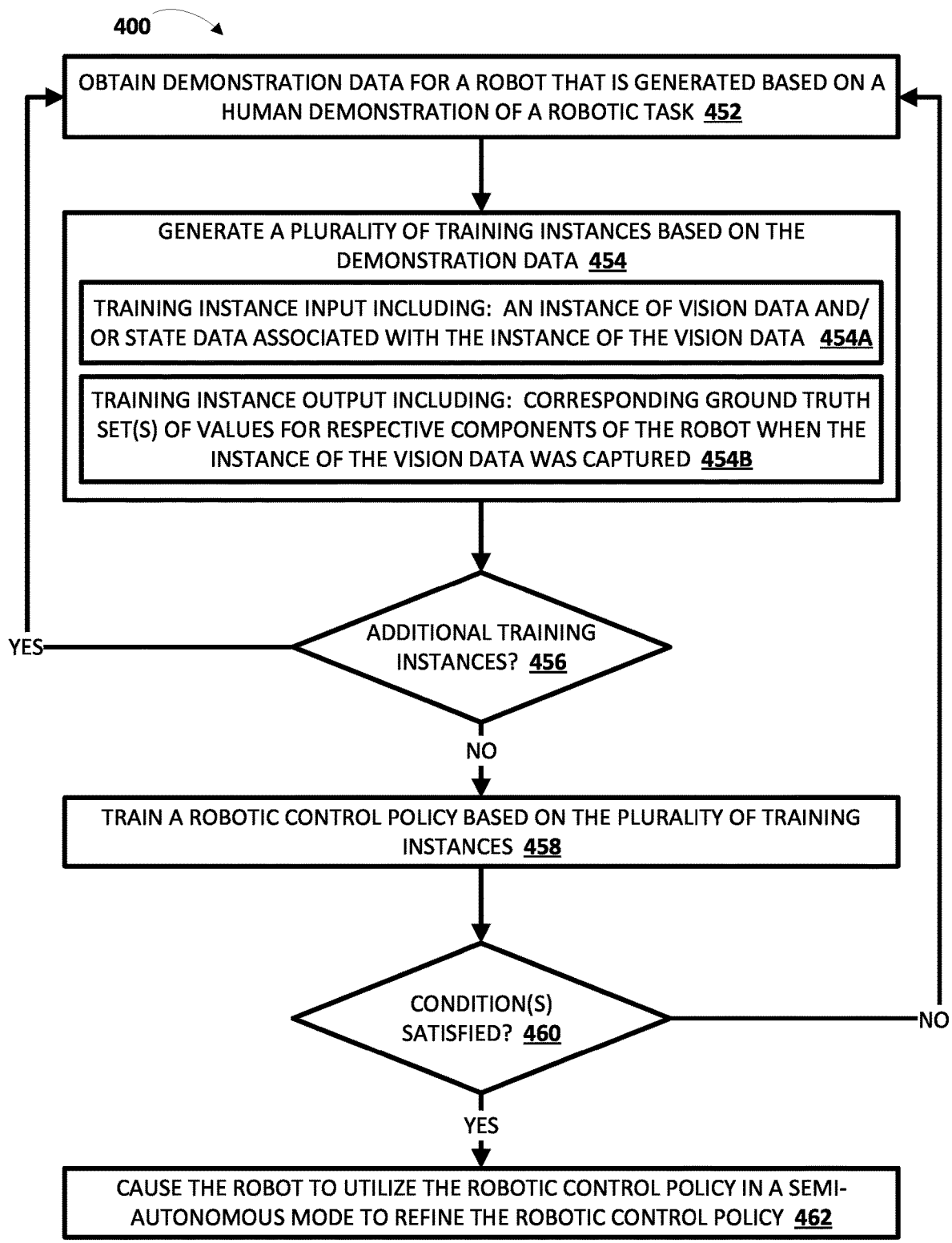
FIG. 4 is a flowchart illustrating an example method of generating training instances based on human demonstrations and bootstrapping a robotic control policy based on the human demonstrations, according to implementations disclosed herein.

In some implementations, the platform can cause the robotic control policy to be automatically trained based on the training instance 320 (e.g., as described with respect to FIG. 4). In additional or alternative implementations, the platform can cause the robotic control policy to be trained in response to user input detected at the platform. For example, in response to a selection of a training graphical element 384, the platform can cause the robotic control policy to be trained based on the training instances 320. In these and the manners, the robotic control policy can be bootstrapped based on the human demonstrations.

In some implementations, and referring specifically to FIG. 3B, the semi-autonomous mode 352B2 can be utilized to refine the robotic control policy based on human interventions received during performance of a semi-autonomous robotic task 330 subsequent to the bootstrapping of the robotic control policy. While in the semi-autonomous mode 352B2, the robotic control policy can be evaluated based on a quantity of human interventions received during performance of the robotic task. In other words, the robot can be evaluated based on how well it performs without the human interventions.

For example, assume the user provides input of "go pick up the cup" as indicated by 352B2A. In this example, the robot can utilize the trained robotic control policy to generate a sequence of actions to traverse a path towards the table 191, and pick up the cup 192. In some implementations, the graphical user interface 380 can additionally or alternatively be utilized to visually render representations of the sequences of actions as the robot performs robotic tasks as indicated by 331, 332, 333, 334, 335, and 336. In some versions of those implementations, the representation of the sequence of actions visually rendered via the graphical user interface 380 includes a sequence of corresponding waypoints overlaying an environment 330A of the robot captured in the instance of the vision data (e.g., as depicted in FIG. 3B). Each of the corresponding waypoints can be associated with one or more components of the robot in response to a given action, included in the sequence of actions, being implemented by the robot. In the example of FIG. 3B, the sequence of waypoints may correspond to a robotic gripper utilized in performance of the grasping task. Although the sequence of actions depicted in FIG. 3B are waypoints for the robot gripper, it should be understood that is for the sake of example and is not meant to be limiting. In additional or alternative implementations, the representation of the sequence of actions visually rendered via the graphical user interface 380 includes a sequence of corresponding states of the robot overlaying the environment 330A of the robot captured in the instance of the vision data. Each of the corresponding states of the robots may correspond to a given state of the robot in response to a given action, included in the sequence of actions, being performed by the robot. In various implementations, the representation of each of the actions can be selectable such that, when selected, the corresponding sets of values for the various components of the robot can be visually rendered for presentation to the user. For example, assume the user selects waypoint 331. In response to the selection of the waypoint 331 by the user, one or more values for the robot can be presented for presentation to the user as indicated by 331A.

In some implementations, the robotic control policy may determine that the robot has failed in performance of the robotic task and/or is predicted to fail to in performance of the robotic task (e.g., using the failure head of the robotic control policy described with respect to FIGS. 1, 2A, and 2B). In those implementations, the platform can generate a prompt 337, and the prompt can be provided for presentation to the user via the graphical user interface 380. The prompt 337 can request that the user intervene in performance of the robotic task. For example, the user can utilize an input device (e.g., the controller 121 of FIG. 1) to take control of the robot and correct one or more actions in performance of the robotic task. One or more losses can be generated based on the user intervening in performance of the robotic task (e.g., as described with respect to FIGS. 1, 2A, and 2B), and one or more of the losses can be subsequently utilized to refine the robotic control policy. In some of those implementations, the user can dismiss the prompt 337 as indicated by 337A. In implementations where the prompt 337 is dismissed, the failure head can be subsequently updated to mitigate occurrences of prompting the user when similar instances of vision data are processed using the robotic control policy and/or when similar actions are generated using the robotic control policy.

In additional or alternative implementations, the user may proactively intervene in performance of the robotic task based on the representation of the sequence of actions visually rendered for presentation to the user. For example, waypoints 335 and 336 indicate that the robot gripper is not predicted to grasp the cup 192 based on the actions. Rather, it appears that the robot will either bump into the table 191 and reach over the cup 192 to perform the grasping task, or go to a far side of the table 191 to perform the grasping task. As a result, the user may proactively utilize an input device (e.g., the controller 121 of FIG. 1) to take control of the robot and correct one or more actions in performance of the robotic task. One or more losses can be generated based on the user intervening in performance of the robotic task (e.g., as described with respect to FIGS. 1, 2A, and 2B), and one or more of the losses can be subsequently utilized to refine the robotic control policy.

Subsequent to any human intervention in performance of the robotic task, the robotic control policy can take control of the robot from the human. However, if during performance of the robotic task, the robotic control policy determines that the robot has failed again or is predicted to fail again, then the platform can generate an additional prompt, and the additional prompt for presentation to the user via the graphical user interface 380. This process can be repeated until the robot completes performance of the robotic task.

In various implementations, one or more metrics related to performance of the robotic task in the semi-autonomous mode 352B2 can be provided for presentation to the user. For example, one or more of the metrics can be associated with performance of the current robotic task in the semi-autonomous mode 352B2 as indicated by 352B2B, performance of historical robotic tasks performed in the semi-autonomous mode 352B2 as indicated by 352B2C, and/or other metrics. In various implementations, the platform can make a recommendation as to particular tasks that should be performed in the semi-autonomous mode 352B2 as indicated by 352B2D.

In some implementations, and subsequent to performance of the semi-autonomous robotic task 330, the robotic control policy can be automatically updated based on one or more losses generated based on the interventions. In some versions of those implementations, a threshold quantity of semi-autonomous robotic tasks may be performance prior to causing the robotic control policy to be refined. In additional or alternative implementations, the robotic control policy can be refined in response to receiving user input. For example, in response to a selection of a refine policy graphical element 385, the robotic control policy can be refined based on one or more of the losses generated during performance of the semi-autonomous robotic task 330.

In some implementations, and referring specifically to FIG. 3C, the autonomous mode 352B3 can be utilized to evaluate performance of the robotic control policy subsequent to refining the robotic control policy in the semi-autonomous mode 352B2. In the autonomous mode 352B3, the user may not be prompted to intervene in performance of an autonomous robotic task 340. A robot can utilize the robotic control policy to perform various robotic tasks autonomously in an environment 340A, and the robotic control policy can be evaluated based on whether or not the robot completes the robotic task and/or how efficient the robot performs the robotic tasks. For example, assume the user provides input of "go pick up the cup" as indicated by 352B3A. In this example, the robot can utilize the refined robotic control policy to generate a sequence an action in furtherance of traversing a path towards the table 191, and picking up the cup 192. Notably, in various implementations at inference, the robotic control policy may only generate a next action, rather than the sequence of actions described above with respect to the semi-autonomous mode 352B2. However, waypoints 341, 342, 343, 344, and 345 are depicted in FIG. 3C for the sake of example, and illustrate that performance of the robotic task has improved based on the robotic control policy being refined in the semi-autonomous mode 352B2 (e.g., as indicated by fewer waypoints and waypoint 345 indicating the robot gripper will correctly grasp the cup 192).

Similar to the semi-autonomous mode 352B2, in various implementations, one or more metrics related to performance of the robotic task in the autonomous mode 352B3 can be provided for presentation to the user. For example, one or more of the metrics can be associated with performance of the current robotic task in the autonomous mode 352B3 as indicated by 352B3B and/or other metrics. In various implementations, the platform can make a recommendation based on performance of the robotic control policy in performing the autonomous robotic task 340. For example, as indicated by 352B3C, the platform can recommend that the robotic control policy should be further refined in the semi-autonomous mode 352B2

Although FIGS. 3A-3C are described with respect to particular robotic tasks, it should be understood that is for the sake of example and is not meant to be limiting. For example, other robotic tasks can be performed to further refine the robotic policy, such as opening doors, sorting through various objects, opening a push-pull door, opening a latched door, navigation and obstacle avoidance tasks, and/or any other task that can be performed by the robot I a real or simulated environment.

Turning now to FIG. 4, a flowchart illustrating an example method 400 of generating training instances based on human demonstrations and bootstrapping a robotic control policy based on the human demonstrations is depicted. In other words, the method 400 describes a bootstrapping mode for training a robotic control policy. For convenience, the operations of the method 400 are described with reference to a system that performs the operations. This system may include one or more processors, such as processor(s) of user input system 140 and/or training system 150. Moreover, while operations of method 400 are shown in a particular order, this is not meant to be limiting. One or more operations may be reordered, omitted or added.

At block 452, the system obtains demonstration data for a robot that is generated based on a human demonstration of a robotic task. The demonstration data can be generated based on human demonstrations performed in a simulated environment using a simulated robot and/or in a real-world environment using an instance of a simulated robot.

At block 454, the system generates a plurality of training instances based on the demonstration data. Each of the training instances can include training instance input and training instance output. The training instance input can include, for example and as indicated at sub-block 454A, an instance of vision data and/or state data associated with the instance of the vision data. The training instance output can include, for example and as indicated at sub-block 454B, one or more corresponding ground truth sets of values for respective components of the robot when the instance of the vision data was captured. Generating the plurality of training instances is described herein (e.g., with respect to the training instance engine 152 of FIG. 1).

At block 456, the system determines whether to generate a plurality of additional training instances. The system can determine whether to generate a plurality of additional training instances based on, for example, a quantity of training instances that are available to train a robotic control policy, a quantity of training instances associated with particular robotic tasks, and/or other criteria. If, at an iteration of block 456, the system determines to generate a plurality of additional training instances, the system returns to block 452 to obtain additional demonstration data for the robot and generates a plurality of additional training instances based on the additional demonstration data at an additional iteration of 454. If, at an iteration of block 456, the system determines not to generate a plurality of additional training instances, the system proceeds to block 458.

At block 458, the system trains a robotic control policy based on the plurality of training instances. Training the robotic control policy is described in detail herein (e.g., with respect to the training engine 154 of FIG. 1).

At block 460, the system determines whether one or more conditions are satisfied. The one or more conditions can include, for example, occurrence of training based on at least a threshold quantity of training instances, a threshold duration of training based on the training instances, and/or other conditions described herein. If, at an iteration of block 460, the system determines the one or more conditions are not satisfied, the system returns to block 452 and repeats the operations of block 452-458. If, at an iteration of block 460, the system determines one or more of the conditions are satisfied, the system proceeds to block 462.

At block 462, the system causes the robot to utilize the robot control policy in a semi-autonomous mode to refine the robotic control policy. The semi-autonomous mode is described in detail herein (e.g., with respect to FIGS. 1 and 3B).

Figure 5:
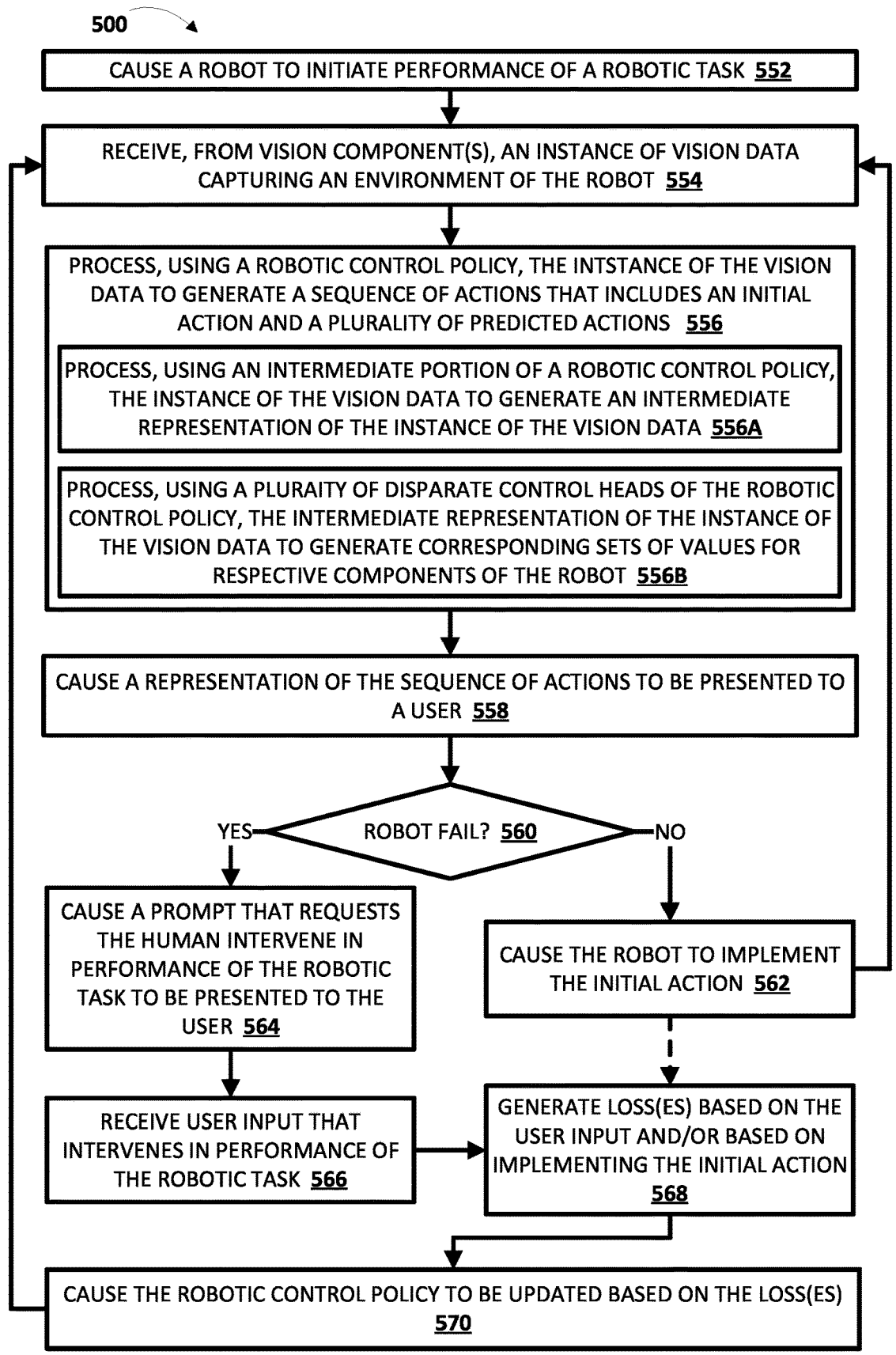
FIG. 5 is a flowchart illustrating an example method of refining a robotic control policy based on a human intervening in performance of a robotic task, according to implementations disclosed herein.

Turning now to FIG. 5, a flowchart illustrating an example method 500 of refining a robotic control policy based on a human intervening in performance of a robotic task is depicted. In other words, the method 500 describes a semi-autonomous mode for refining a trained robotic control policy. For convenience, the operations of the method 500 are described with reference to a system that performs the operations. This system may include one or more processors, such as processor(s) of user input system 140, training system 150, and/or robot system 160 of FIG. 1. Moreover, while operations of method 500 are shown in a particular order, this is not meant to be limiting. One or more operations may be reordered, omitted or added.

At block 552, the system causes a robot to initiate performance of a robotic task. The system can cause the robot to initiate performance of the robotic task in response to receiving user input to initiate performance of the robotic task at one or more computing devices.

At block 554, the system receives, from one or more vision components, an instance of vision data capturing an environment of the robot. The vision components can be a component of the robot and/or external to the robot.

At block 556, the system processes, using a robotic control policy, the instance of the vision data to generate a sequence of action that includes an initial action and a plurality of predicted actions that are predicted to follow the initial action. In some implementations, and as indicated at sub-block 556A, the system processes, using an intermediate portion of a robotic control policy, the instance of the vision data to generate an intermediate representation of the instance of the vision data. Further, and as indicated at sub-block 556B, the system processes, using a plurality of disparate control heads of the robotic control policy, the intermediate representation of the instance of the vision data to generate corresponding sets of values for respective components of the robot. In some implementations, the system may only generate the sequence of actions in a particular mode, such as in the semi-autonomous mode described herein (e.g., with respect to FIGS. 1, 3B, and 3C). In additional or alternative implementations, the system may only generate the initial action.

At block 558, the system causes a representation of the sequence of actions to be presented to a user. In some implementations, the system may only cause the representation of the sequence of actions to be presented to the user in a particular mode, such as in the bootstrapping mode, the semi-autonomous mode, and/or the autonomous mode described herein (e.g., with respect to FIGS. 1 and 3A-3C).

At block 560, the system determines whether the robot has failed, or is predicted to fail, in performance of the robotic task. The system can determine whether the robot has failed, or is predicted to fail, in performance of the robotic task based on output generated using the robotic control policy (e.g., using the failure head described with respect to FIGS. 1, 2A, and 2B).

If, at an iteration of block 560, the system determines that the robot has failed, or is predicted to fail, in performance of the robotic task, the system proceeds to block 562. At block 562, the system causes the robot to implement the initial action. For example, the system can utilize the corresponding sets of values for the respective components of the robot to actuate the respective components of the robot to perform the initial action. The system may then return to block 554 to receive, from one or more of the vision components, an additional instance of the vision data capturing the environment of the robot and repeat the remaining operations of the method 500 until performance of the robotic task is complete.

If, at an iteration of block 560, the system determines that the robot has not failed, and is not predicted to fail, in performance of the robotic task, the system proceeds to block 564. At block 564, the system causes a prompt that requests the human intervene in performance of the robotic task to be presented to the user. The prompt can be visually and/or audibly rendered for presentation to the user via the robot or a computing device.

At block 566, the system receives user input that intervenes in performance of the robotic task. The user input can control the robot and recover from the failure in performance of the robotic task and/or prevent the failure in performance of the robotic task. In some implementations, the user can provide the input via one or more computing devices in communication with the robot responsive to the prompt. In additional or alternative implementations, the user may proactively intervene in performance of the robotic task without any prompt being rendered for presentation to the user.

At block 568, the system generates one or more losses based on the user input and/or based on implementing the initial action. In some implementations, such as when the user input is received, the corresponding sets of values for the respective components of the robot generated using the robotic control policy at block 556, one or more of the losses can be generated based on comparing the corresponding sets of values for the respective components of the robot to corresponding alternative sets of values for the respective components of the robot. In additional or alternative implementations, such when the robot implements the initial action at block 562, the system can compare the corresponding sets of values for the respective components of the robot to corresponding demonstration sets of values from one or more human demonstrations of the same robotic task (if any). Generating one or more of the losses in this manner is described in detail herein (e.g., with respect to FIGS. 1 and 2).

At block 570, the system causes the robotic control policy to be updated based on one or more of the losses. In some implementations, one or more of the losses generated at block 568 are associated with specific control heads, and the corresponding specific control heads can be updated based on the associated one or more losses. The system may then return to block 554 to receive, from one or more of the vision components, an additional instance of the vision data capturing the environment of the robot and repeat the remaining operations of the method 500 until performance of the robotic task is complete. In some implementations, the system can cause the robot to initiate performance of an additional robotic task. In some versions of those implementations, the system can continue performing additional robotic task until one or more conditions are satisfied. The one or more conditions can include, for example, convergence of the robotic control policy (e.g., zero loss(es) or within a threshold range of zero loss(es)), determination that the robotic control policy performs better (e.g., with respect to precision and/or recall) than the instance of the robotic control policy currently being utilized (if any), occurrence of refining based on at least a threshold quantity of human interventions, and/or a threshold duration of refining in the semi-autonomous mode.

Figure 6:
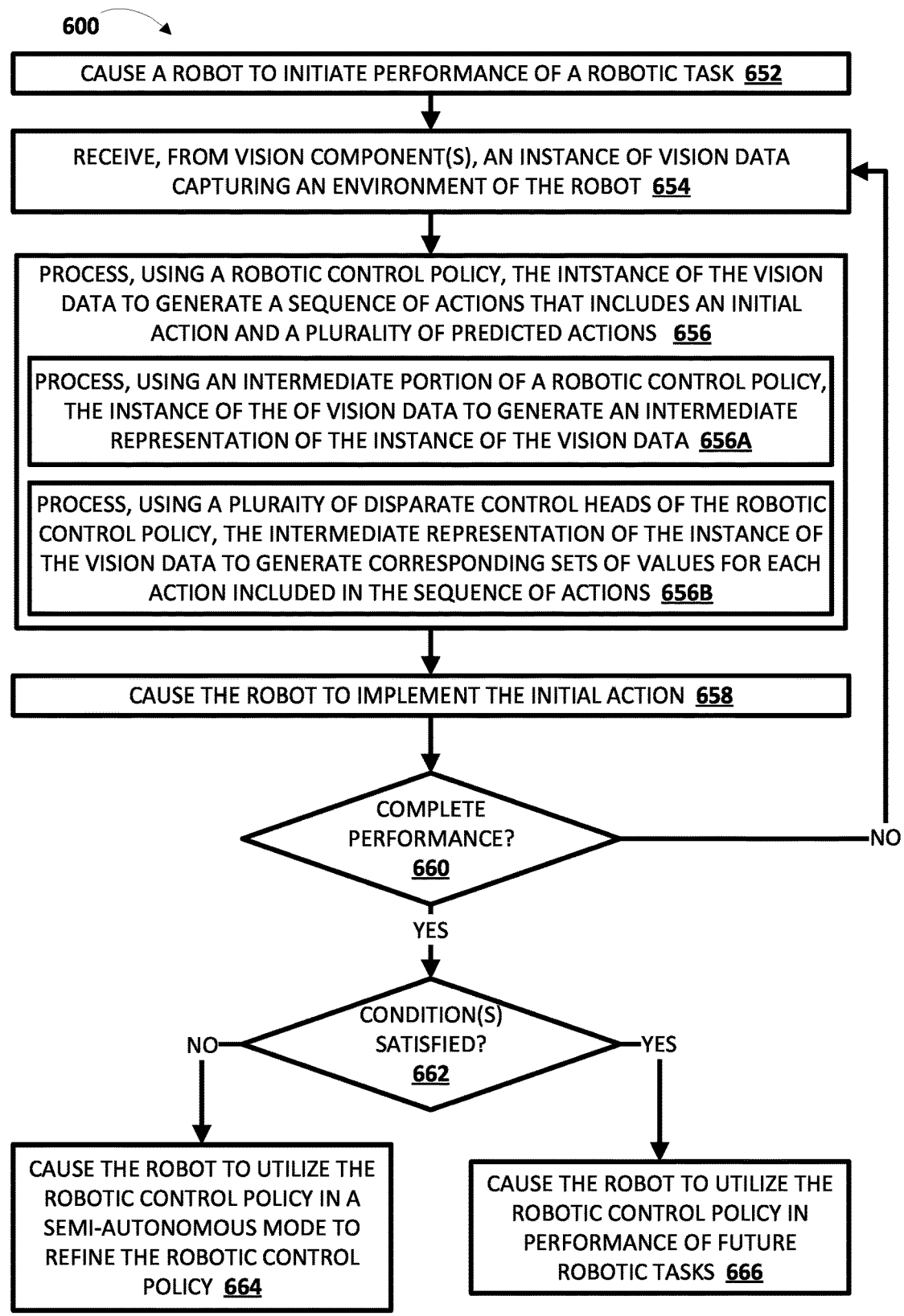
FIG. 6 is a flowchart illustrating an example method of utilizing a robotic control policy in autonomously controlling a robot, according to implementations disclosed herein.

Turning now to FIG. 6, a flowchart illustrating an example method 600 of utilizing a robotic control policy in autonomously controlling a robot is depicted. In other words, the method 600 describes an autonomous mode for utilizing a refined robotic control policy. For convenience, the operations of the method 600 are described with reference to a system that performs the operations. This system may include one or more processors, such as processor(s) of robot system 160 of FIG. 1. Moreover, while operations of method 600 are shown in a particular order, this is not meant to be limiting. One or more operations may be reordered, omitted or added.

At block 652, the system causes a robot to initiate performance of a robotic task. At block 654, the system receives, from one or more vision components, an instance of vision data capturing an environment of the robot. At block 656, the system processes, using a robotic control policy, the instance of the vision data to generate a sequence of action that includes an initial action and a plurality of predicted actions that are predicted to follow the initial action. The system can perform the operations of block 652-656 in the same or similar manner described with respect to blocks 552-556, respectively, of FIG. 5. At block 658, the system causes the robot to implement the initial action. The system can implement the initial action in the same or similar manner described with respect to block 562 of FIG. 5.

At block 660, the system determines whether the robot has completed performance of the robotic task. The system can determine whether the robot has completed performance of the robotic task based on output generated using the robotic control policy (e.g., using the failure head described with respect to FIGS. 1, 2A, and 2B). If, at an iteration of block 660, the system determines the robot has not completed performance of the robotic task, the system returns to block 654. The system may then return to block 754 to receive, from one or more of the vision components, an additional instance of the vision data capturing the environment of the robot and repeat the remaining operations of blocks 654-660 until performance of the robotic task is complete. If, at an iteration of block 660, the system determines the robot has completed performance of the robotic task, the system proceeds to block 662.

At block 662, the system determines whether one or more conditions are satisfied. The one or more conditions can include, for example, determination that the robotic control policy performs better (e.g., with respect to precision and/or recall) than the instance of the robotic control policy currently being utilized (if any), achievement of a threshold measure of autonomy of the robot without failing in performance of the robotic task, and/or other conditions described herein. If, at an iteration of block 662, the system determines the one or more conditions are not satisfied, the system proceeds to block 664. At block 664, the system causes the robot to utilize the robotic control policy in a semi-autonomous mode to refine the robotic control policy. In other words, the system can test the robotic control policy in the autonomous mode, but determine the robotic control policy needs to be further refined and return the semi-autonomous mode (e.g., described with respect to FIG. 5). If, at an iteration of block 662, the system determines one or more of the conditions are satisfied, the system proceeds to block 666.

At block 666, the system causes the robot to utilize the robotic control policy in performance of future robotic tasks. In some implementations, the robotic control policy may be trained, refined, and utilized for specific robotic tasks (or specific aspects of a given robotic task). For example, the system may train and refine a first robotic control policy for grasping tasks, a second robotic control policy for motion tasks, etc. In this example, the first and second robotic control policies can be utilized in performance of their respective robotic tasks or both utilized in performance of a combined task (e.g., opening a latched door). In other implementations, a single robotic control policy can be trained, refined, and utilized for multiple robotic tasks (or multiple aspects of a given robotic task). For example, the system may train and refine a robotic control policy for grasping tasks, motion tasks, etc. In this example.

Figure 7:
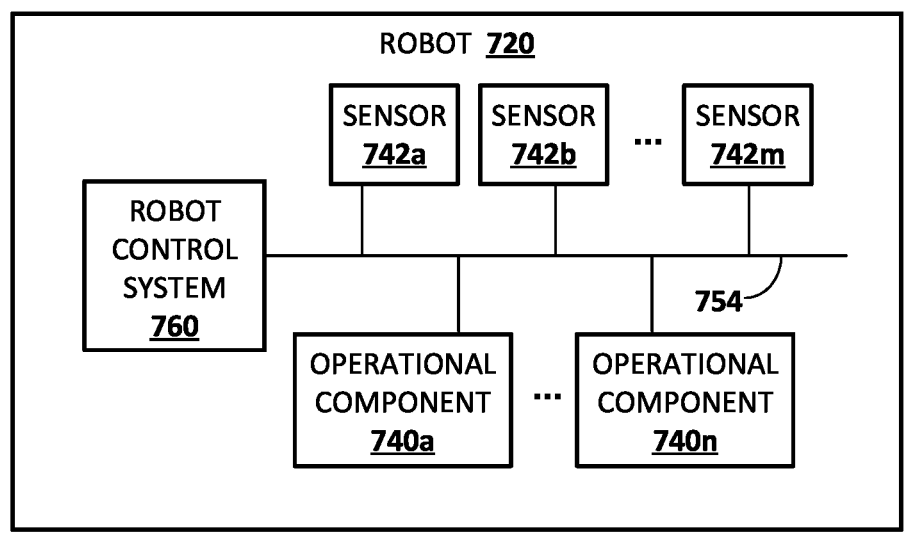
FIG. 7 schematically depicts an example architecture of a robot.

Turning now to FIG. 7, an example architecture of a robot 720 is schematically depicted. The robot 720 includes a robot control system 760, one or more operational components 740a-740n, and one or more sensors 742a-742m. The sensors 742a-742m may include, for example, vision sensors, light sensors, pressure sensors, pressure wave sensors (e.g., microphones), proximity sensors, accelerometers, gyroscopes, thermometers, barometers, and so forth. While sensors 742a-742m are depicted as being integral with robot 720, this is not meant to be limiting. In some implementations, sensors 742a-742m may be located external to the robot 720, e.g., as standalone units.

Operational components 740a-740n may include, for example, one or more end effectors and/or one or more servo motors or other actuators to effectuate movement of one or more components of the robot. For example, the robot 720 may have multiple degrees of freedom and each of the actuators may control actuation of the robot 720 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 760 may be implemented in one or more processors, such as a CPU, GPU, and/or other controller(s) of the robot 720. In some implementations, the robot 720 may comprise a "brain box" that may include all or aspects of the control system 760. For example, the brain box may provide real time bursts of data to the operational components 740a-740n, with each of the real time bursts comprising a set of one or more control commands that dictate, inter alio, the parameters of motion (if any) for each of one or more of the operational components 740a-740n. In some implementations, the robot control system 760 can be used to implement actions described herein, whether they be actions selected based on an engineered policy according to techniques disclosed herein, or actions selected using an RL policy model that is trained based at least in part on RL compatible data generated according to techniques disclosed herein.

Although control system 760 is illustrated in FIG. 7 as an integral part of the robot 720, in some implementations, all or aspects of the control system 760 may be implemented in a component that is separate from, but in communication with, the robot 720. For example, all or aspects of control system 760 may be implemented on one or more computing devices that are in wired and/or wireless communication with the robot 720, such as computing device 810.

Figure 8:
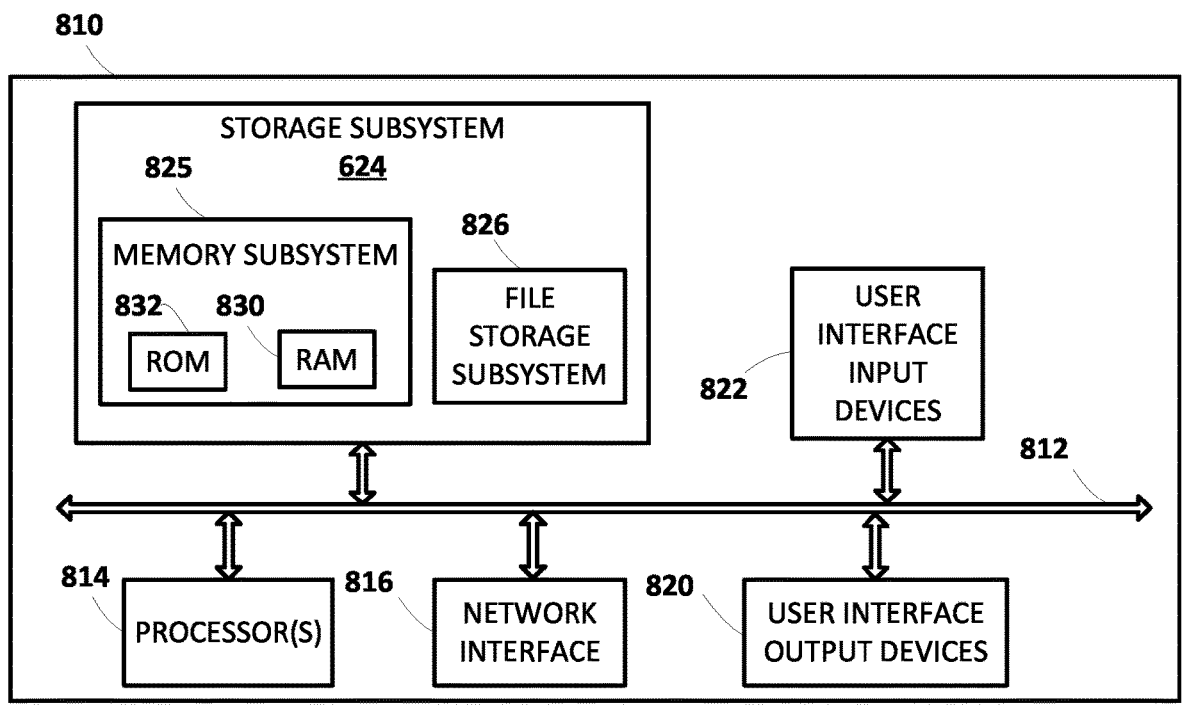
FIG. 8 schematically depicts an example architecture of a computer system.

Turning now to FIG. 8, a block diagram of an example computing device 810 that may optionally be utilized to perform one or more aspects of techniques described herein is depicted. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIG. 4, the method of FIG. 5, and/or the method of FIG. 6.

These software modules are generally executed by processor 814 alone or in combination with other processors. Memory 825 used in the storage subsystem 824 can include a number of memories including a main random-access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In some implementations, a method implemented by one or more processors is provided and includes receiving, from one or more vision components of a robot, an instance of vision data capturing an environment of the robot, the instance of the vision data being captured during performance of a robotic task by the robot; processing, using a robotic control policy, the instance of the vision data to generate a sequence of actions to be performed by the robot during the robotic task, the sequence of actions including an initial action to be performed by the robot in furtherance of the robotic task and a plurality of predicted actions that are predicted to follow the initial action; determining, based on processing the instance of the vision data using the robotic control policy, whether the robot will fail in performance of the robotic task; and in response to determining that the robot will fail in performance of the robotic task: causing a prompt to be rendered via an interface of a computing device or the robot, the prompt requesting a user of the computing device intervene in performance of the robotic task; receiving, from a user of the computing device, and based on the prompt, user input that intervenes with performance of the robotic task, the user input being received via an input device of the computing device or an additional computing device; and causing the robotic control policy to be updated based on the user input.

These and other implementations of the technology disclosed herein can include one or more of the following features.

In some implementations, the method can further include in response to determining that the robot will not fail in performance of the robotic action, causing the robot to perform the initial action. The method can further include, until the robot completes performance of the robotic task: receiving, from one or more of the vision components of the robot, an additional instance of vision data capturing the environment of the robot, the additional instance of the vision data being captured during performance of the robotic task by the robot; processing, using the robotic control policy, the additional instance of the vision data to generate an additional sequence of actions to be performed by the robot during the robotic task, the additional sequence of actions including a next action to be performed by the robot in furtherance of the robotic task and an additional plurality of predicted actions that are predicted to follow the next action; and determining, based on processing the additional instance of the vision data using the robotic control policy, whether the robot will fail in performance of the robotic task.

In some versions of those implementations, each action included in the sequence of actions can include a corresponding first set of values for a first component of the robot, and each action included in the sequence of actions can also include a corresponding second set of values for a second component of the robot.

In some further versions of those implementations causing the robot to perform the initial action can include causing the robot to utilize the corresponding first set of values to actuate the first component of the robot, and causing the robot to utilize the corresponding second set of values to actuate the second component of the robot. In even further versions of those implementations, the first component of the robot can be one of: a robot arm, a robot end effector, a robot base, or a robot head. In yet further versions of those implementations, the second component of the robot can be another one of: a robot arm, a robot end effector, a robot base, or a robot head.

In some additional or alternative further versions of those implementations, causing the robotic control policy to be updated based on the user input can be subsequent to determining that the robot has completed performance of the robotic task.

In some implementations, processing the instance of the vision data to generate the sequence of actions using the robotic control policy can include processing, using an intermediate portion of a robotic control policy, the instance of the vision data to generate an intermediate representation of the instance of the vision data; processing, using a first control head of the robotic control policy, the intermediate representation of the instance of the vision data to generate, for each action included the sequence of actions, a corresponding first set of values for a first component of the robot; and processing, using a second control head of the robotic control policy, the intermediate representation of the instance of the vision data to generate, for each action included the sequence of actions, a corresponding second set of values for a second component of the robot. In some versions of those implementations, the method can further include, in response to receiving the user input that intervenes with performance of the robotic task: generating, based on the user input, and for one or more actions included in the sequence of actions, a corresponding alternative first set of values, for the first component of the robot, and a corresponding alternative second set of values, for the second component of the robot, that the robot should utilize in performance of the robotic task; generating, based on comparing the corresponding first set of values to the corresponding alternative first set of values, a first loss; and generating, based on comparing the corresponding second set of values to the corresponding alternative second set of values, a second loss. Causing the robotic control policy to be updated can be based on the first loss and the second loss. In some further versions of those implementations, the first loss can be generated using a first loss function, and the second loss can be generated using a distinct second loss function.

In some implementations, processing the instance of the vision data to generate a sequence of actions to be performed by the robot during the robotic task can include processing, using an intermediate portion of the robotic control policy, the instance of the vision data to generate an intermediate representation of the instance of the vision data. The sequence of actions can be generated based on the intermediate representation of the instance of the vision data.

In some versions of those implementations, determining whether the robot will fail in performance of the robotic task can include processing, using a control head of the robotic control policy, the intermediate representation of the instance of the vision data to generate, for one or more actions included in the sequence of actions, one or more corresponding sets of values associated with performance of the robotic task; and determining that the robot will fail in performance of the robotic task based on the corresponding set of values.

In some further versions of those implementations, determining that the robot will fail in performance of the robotic task can be based on one or more of the corresponding set of values associated with the initial action. In additional or alternative versions of those further implementations determining that the robot will fail in performance of the robotic task can be based on one or more of the corresponding set of values associated with one or more of the plurality of predicted actions that follow the initial action. In additional or alternative versions of those further implementations, the corresponding set of values associated with performance of the robotic task can include a corresponding value associated with one or more of: whether the robot will fail in performance of the robotic task, whether the robot will continue in performance of the robotic task, or whether the robot has completed performance of the robotic task.

In some implementations, the robot can be a simulated robot, the environment of the robot can be a simulated environment of the simulated robot, and the robotic task can be performed by the simulated robot in the simulated environment.

In some implementations, the robot can be a real robot, the environment of the robot can be a real-world environment of the real robot, and the robotic task can be performed by the real robot in the real-world environment.

In some implementations, a method implemented by one or more processors is provided and includes receiving, from one or more vision components of a robot, an instance of vision data capturing an environment of the robot, the image data being captured during performance of a robotic task by the robot; processing, using a robotic control policy, the instance of the vision data to generate a sequence of actions to be performed by the robot during the robotic task, the sequence of actions including an initial action to be performed by the robot in furtherance of the robotic task and a plurality of predicted actions that follow the initial action; causing, during performance of the robotic task, a representation of the sequence of actions to be visually rendered via a graphical user interface of a computing device; receiving, from a user of the computing device, and based on the representation of the sequence of actions, user input that intervenes with performance of the robotic task, the user input being received via the computing device or an additional computing device; and causing the robotic control policy to be updated based on the user input.

These and other implementations of the technology disclosed herein can include one or more of the following features.

In some implementations, the representation of the sequence of actions visually rendered via the graphical user interface of the computing device can include a sequence of corresponding waypoints overlaying the environment of the robot captured in the instance of the vision data, each of the corresponding waypoints being associated with one or more components of the robot in response to a given action, included in the sequence of actions, being performed by the robot.

In some implementations, the representation of the sequence of actions visually rendered via the graphical user interface of the computing device can include a sequence of corresponding states of the robots overlaying the environment of the robot captured in the instance of the vision data, each of the corresponding states of the robots corresponding to a given state of the robot in response to a given action, included in the sequence of actions, being performed by the robot.

In some implementations, processing the instance of the vision data to generate the sequence of action using the robotic control policy can include processing, using an intermediate portion of a robotic control policy, the instance of the vision data to generate an intermediate representation of the instance of the vision data; processing, using a first control head of the robotic control policy, the intermediate representation of the instance of the vision data to generate, for each action included the sequence of actions, a corresponding first set of values for a first component of the robot; and processing, using a second control head of the robotic control policy, the intermediate representation of the instance of the vision data to generate, for each action included the sequence of actions, a corresponding second set of values for a second component of the robot.

In some versions of those implementations, the representation of the sequence of actions visually rendered via the graphical user interface of the computing device can include a corresponding representation of each action included in the sequence of actions. In some further versions of those implementations, the corresponding representation of each action included in the sequence of actions can be selectable and, when selected, causes the one or more of the corresponding first set of values for the first component or the corresponding second set of values for the second component to be visually rendered via the graphical user interface of the computing device.

In some versions of those implementations, the method can further include, in response to receiving the user input that intervenes with performance of the robotic task: generating, based on the user input, and for one or more actions included in the sequence of actions, a corresponding alternative first set of values, for the first component of the robot, and a corresponding alternative second set of values, for the second component of the robot, that the robot should utilize in performance of the robotic task; generating, based on comparing the corresponding first set of values to the corresponding alternative first set of values, a first loss; and generating, based on comparing the corresponding second set of values to the corresponding alternative second set of values, a second loss. Causing the robotic control policy to be updated can be based on the first loss and the second loss.

In some implementations, the method can further include receiving, from the user of the computing device, and subsequent to performance of the robotic task, additional user input associated with data generated during performance of the robotic task. Causing the robotic control policy to be updated can be further based on the additional user input. In some versions of those implementations, the additional user input can relabel data generated during performance of the robotic task, and the data generated during performance of the robotic task can be generated using the robotic control policy or can be generated based on the user input.

In some implementations, a method implemented by one or more processors is provided and includes receiving, from one or more vision components of a robot, an instance of vision data capturing an environment of the robot, the instance of the vision data being captured during performance of a robotic task by the robot; processing, using an intermediate portion of a robotic control policy, the instance of the vision data to generate an intermediate representation of the instance of the vision data; processing, using a first control head of the robotic control policy, the intermediate representation of the instance of the vision data to generate, for an action to be performed by the robot in furtherance of the robotic task, a corresponding first set of values for a first portion of control of a component of the robot; processing, using a second control head of the robotic control policy, the intermediate representation of the instance of the vision data to generate, for the action, a corresponding second set of values for a second portion of control of the component of the robot; receiving, from a user of a computing device, user input that intervenes with performance of the robotic task, the user input being received via the computing device or an additional computing device; and causing the robotic control policy to be updated based on the user input.

These and other implementations of the technology disclosed herein can include one or more of the following features.

In some implementations, causing the robotic control policy to be updated based on the user input can include generating, based on the user input, and for the action, a corresponding alternative first set of values and a corresponding alternative second set of values that the robot should utilize in performance of the robotic task; generating, based on comparing the corresponding first set of values to the corresponding alternative first set of values and using a first loss function, a first loss; and generating, based on comparing the corresponding second set of values to the corresponding alternative second set of values and using a second loss function, a second loss. Causing the robotic control policy to be updated can be based on the first loss and the second loss.

In some versions of those implementations, causing the robotic control policy to be updated based on the first loss and the second loss can include updating the first control head of the robotic control policy based on the first loss; and updating the second control head of the robotic control policy based on the second loss.

In some versions of those implementations, the method can further include processing, using a third control head of the robotic control policy, the intermediate representation of the instance of the vision data to generate, for the action, a corresponding third set of values for an additional component of the robot. In some versions of those implementations, causing the robotic control policy to be updated based on the user input further can include generating, based on the user input, and for the action, a corresponding alternative third set of values; and generating, based on comparing the corresponding third set of values to the corresponding alternative third set of values, a third loss. Causing the robotic control policy to be updated can be further based on the third loss. In some further versions of those implementations, causing the robotic control policy to be updated based on the third loss can include updating the third control head of the robotic control policy based on the third loss.

In some implementations, the first component of the robot can be one of: a robot arm, a robot end effector, a robot base, or a robot head. In some versions of those implementations, the first portion of control can be a positional change for the first component and the second portion of control can be an orientation change for the first component.

In some implementations, a method implemented by one or more processors is provided and includes receiving, from one or more vision components of a robot, an instance of vision data capturing an environment of the robot, the instance of the vision data being captured during performance of a robotic task by the robot; processing, using an intermediate portion of a robotic control policy, the instance of the vision data to generate an intermediate representation of the instance of the vision data; processing, using a first control head of the robotic control policy, the intermediate representation of the instance of the vision data to generate, for an action to be performed by the robot in furtherance of the robotic task, a corresponding first set of values for a first portion of control of a component of the robot; processing, using a second control head of the robotic control policy, the intermediate representation of the instance of the vision data to generate, for the action, a corresponding second set of values for a second portion of control of the component of the robot; and causing the robot to perform the action. Causing the robot to perform the action can include causing the robot to utilize the corresponding first set of values and the corresponding second set of values in controlling the component of the robot.

These and other implementations of the technology disclosed herein can include one or more of the following features.

In some implementations, the method can further include processing, using a third control head of the robotic control policy, the intermediate representation of the instance of the vision data to generate, for the action, a corresponding third set of values for at least a portion of control of an additional component of the robot. Causing the robot to perform the action further can include causing the robot to utilize the corresponding third set of values to control the third component of the robot.

Various implementations can include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described herein. Yet other implementations can include a system of one or more computers and/or one or more robots that include one or more processors operable to execute stored instructions to perform a method such as one or more of the methods described herein.

What is claimed is:

1. A method implemented using one or more processors, the method comprising:
   receiving, from one or more vision components of a robot,
      an instance of vision data capturing an environment of the robot, the vision data being captured during performance of a robotic task by the robot;
processing, using a robotic control policy, the instance of the vision data to generate a sequence of actions to be performed by the robot during the robotic task, wherein the sequence of actions includes an initial action to be performed by the robot in furtherance of the robotic task and a plurality of predicted actions that follow the initial action, and wherein processing the instance of the vision data to generate the sequence of actions to be performed by the robot during the robotic task and using the robotic control policy comprises:
  processing, using an intermediate portion of the robotic control policy, the instance of the vision data to generate an intermediate representation of the instance of the vision data;
  processing, using a first control head of the robotic control policy, the intermediate representation of the instance of the vision data to generate, for the initial action and for each of the plurality of predicted actions that follow the initial action, a corresponding first set of values for a first portion of control of a component of the robot;
  processing, using a second control head of the robotic control policy, the intermediate representation of the instance of the vision data to generate, for the initial action and for each of the plurality of predicted actions that follow the initial action, a corresponding second set of values for a second portion of control of the component of the robot; and
  processing, using a third control head of the robotic control policy, the intermediate representation of the instance of the vision data to generate, for the initial action and for each of the plurality of predicted actions that follow the initial action, a corresponding third set of values for a third portion of control of the component of the robot;
causing, based on the sequence of actions to be performed, the robot to initiate performance of the robotic task;
during performance of the robotic task:
  causing a representation of the sequence of actions to be visually rendered via a graphical user interface of a computing device; and
  receiving, from a user of the computing device, and based on the representation of the sequence of actions, user input that intervenes with ongoing performance of the robotic task, the user input being received via the computing device or an additional computing device; and
causing the robotic control policy to be updated based on the user input.

2. The method of claim 1, wherein the representation of the sequence of actions visually rendered via the graphical user interface of the computing device comprises a sequence of corresponding waypoints overlaying the environment of the robot captured in the instance of the vision data, each of the corresponding waypoints being associated with one or more components of the robot in response to a given action, included in the sequence of actions, being performed by the robot.

3. The method of claim 1, wherein the representation of the sequence of actions visually rendered via the graphical user interface of the computing device comprises a sequence of corresponding states of the robot overlaying the environment of the robot captured in the instance of the vision data, each of the corresponding states of the robot corresponding to a given state of the robot in response to a given action, included in the sequence of actions, being performed by the robot.

4. The method of claim 1, wherein the representation of the sequence of actions visually rendered via the graphical user interface of the computing device comprises a corresponding representation of the initial action and each of the plurality of predicted actions that follow the initial action.

5. The method of claim 4, wherein the corresponding representation of each action included in the sequence of actions is selectable and, when selected, causes the one or more of the corresponding first set of values for the first portion of control of the component of the robot, the corresponding second set of values for the second portion of control of the component of the robot, and/or the corresponding third set of values for the third portion of control of the component of the robot to be visually rendered via the graphical user interface of the computing device.

6. The method of claim 1, further comprising:
  in response to receiving the user input that intervenes with ongoing performance of the robotic task:
    generating, based on the user input, and for one or more actions included in the sequence of actions, a corresponding alternative first set of values, for the first portion of control of the component of the robot, a corresponding alternative second set of values, for the second portion of control of the component of the robot, and a corresponding alternative third set of values, for the third portion of control of the component of the robot, that the robot should utilize in performance of the robotic task;
    generating, based on comparing the corresponding first set of values to the corresponding alternative first set of values, a first loss;
    generating, based on comparing the corresponding second set of values to the corresponding alternative second set of values, a second loss;
    generating, based on comparing the corresponding third set of values to the corresponding alternative third set of values, a third loss and
    wherein causing the robotic control policy to be updated is based on the first loss, the second loss, and the third loss.

7. The method of claim 1, further comprising:
  receiving, from the user of the computing device, and subsequent to performance of the robotic task, additional user input associated with data generated during performance of the robotic task; and
  wherein causing the robotic control policy to be updated is further based on the additional user input.

8. The method of claim 7, wherein the additional user input relabels data generated during performance of the robotic task, and wherein the data generated during performance of the robotic task is generated using the robotic control policy or generated based on the user input.

9. A method implemented using one or more processors, the method comprising:
  receiving, from one or more vision components of a robot, an instance of vision data capturing an environment of the robot, the instance of the vision data being captured during performance of a robotic task by the robot;
  processing, using an intermediate portion of a robotic control policy, the instance of the vision data to generate an intermediate representation of the instance of the vision data;
  processing, using a first control head of the robotic control policy, the intermediate representation of the instance of the vision data to generate, for an action to be performed by the robot in furtherance of the robotic task, a corresponding first set of values for a first portion of control of a component of the robot;

processing, using a second control head of the robotic control policy, the intermediate representation of the instance of the vision data to generate, for the action, a corresponding second set of values for a second portion of control of the component of the robot;

processing, using a third control head of the robotic control policy, the intermediate representation of the instance of the vision data to generate, for the action, a corresponding third set of values for a third portion of control of the component of the robot; and causing the robot to perform the action, wherein causing the robot to perform the action comprises:
  causing the robot to utilize: (i) the corresponding first set of values for the first portion of control of the component of the robot; (ii) the corresponding second set of values for the second portion of control of the component of the robot; and (iii) the corresponding third set of values for the third portion of control of the component of the robot.

10. The method of claim 9, further comprising:
processing, using a fourth control head of the robotic control policy, the intermediate representation of the instance of the vision data to generate, for the action, a corresponding fourth set of values for at least a portion of control of an additional component of the robot,
wherein causing the robot to perform the action further comprises:
  causing the robot to utilize the corresponding fourth set of values for the portion of control of the additional component of the robot.

11. The method of claim 10, wherein the component of the robot is a robot gripper.

12. The method of claim 11, wherein the additional component is one of: a robot based, or a robot arm.

13. The method of claim 9, wherein the component of the robot is a robot gripper, and wherein the corresponding first set of values for the first portion of control of the robot gripper control one of: a translational displacement of the robot gripper, an orientation of the robot gripper, or an actuation state of the robot gripper.

14. The method of claim 13, wherein the corresponding second set of values for the second portion of control of the robot gripper control another one of: the translational displacement of the robot gripper, the orientation of the robot gripper, or the actuation state of the robot gripper.

15. The method of claim 14, wherein the corresponding third set of values for the third portion of control of the robot gripper control yet another one of: the translational displacement of the robot gripper, the orientation of the robot gripper, or the actuation state of the robot gripper.

16. A system comprising:
one or more processors; and
memory storing instructions that, when executed by the one or more processors, cause the one or more processors to:
  receive, from one or more vision components of a robot, an instance of vision data capturing an environment of the robot, the instance of the vision data being captured during performance of a robotic task by the robot;
  process, using an intermediate portion of a robotic control policy, the instance of the vision data to generate an intermediate representation of the instance of the vision data;
  process, using a first control head of the robotic control policy, the intermediate representation of the instance of the vision data to generate, for an action to be performed by the robot in furtherance of the robotic task, a corresponding first set of values for a first portion of control of a component of the robot;
  process, using a second control head of the robotic control policy, the intermediate representation of the instance of the vision data to generate, for the action, a corresponding second set of values for a second portion of control of the component of the robot;
  process, using a third control head of the robotic control policy, the intermediate representation of the instance of the vision data to generate, for the action, a corresponding third set of values for a third portion of control of the component of the robot; and
  cause the robot to perform the action, wherein the instructions to cause the robot to perform the action comprise instructions to:
    cause the robot to utilize: (i) the corresponding first set of values for the first portion of control of the component of the robot; (ii) [and] the corresponding second set of values for the second portion of control of the component of the robot; and (iii) the corresponding third set of values for the third portion of control of the component of the robot.

17. The system of claim 16, wherein the component of the robot is a robot gripper, and wherein the corresponding first set of values for the first portion of control of the robot gripper control one of: a translational displacement of the robot gripper, an orientation of the robot gripper, or an actuation state of the robot gripper.

18. The system of claim 17, wherein the corresponding second set of values for the second portion of control of the robot gripper control another one of: the translational displacement of the robot gripper, the orientation of the robot gripper, or the actuation state of the robot gripper.

19. The system of claim 18, wherein the corresponding third set of values for the third portion of control of the robot gripper control yet another one of: the translational displacement of the robot gripper, the orientation of the robot gripper, or the actuation state of the robot gripper.

* * * * *